United States Patent [19]
Morita et al.

[11] Patent Number: 5,480,221
[45] Date of Patent: Jan. 2, 1996

[54] REAR WHEEL BRAKING FORCE CONTROL METHOD AND AN APPARATUS THEREFOR

[75] Inventors: Takao Morita, Toyota; Tsutomu Matsukawa, Okazaki; Hiromichi Yasunaga, Okazaki; Tadao Tanaka, Okazaki; Akihiko Togashi, Okazaki; Yasutaka Taniguchi, Hoi; Masanori Tani, Okazaki, all of Japan

[73] Assignee: Mitsubishi Jidosha Kogyo Kabushiki Kaisha, Tokyo, Japan

[21] Appl. No.: 366,445

[22] Filed: Dec. 30, 1994

Related U.S. Application Data

[63] Continuation of Ser. No. 94,034, filed as PCT/JP92/01555, Nov. 27, 1992, abandoned.

[30] Foreign Application Priority Data

Nov. 29, 1991 [JP] Japan .................................. 3-315659
Jun. 30, 1992 [JP] Japan .................................. 4-172581

[51] Int. Cl.$^6$ .................................................. B60T 8/30
[52] U.S. Cl. ..................... 303/113.5; 303/116.1; 303/119.1; 303/DIG. 2; 303/159
[58] Field of Search ........................ 303/9.62, 9.71, 303/9.73, 9.75, 15, 100, 103, 105, 110, 111, 119.1, 113.1, 115.2, 113.5, 116.1, DIG. 2; 364/426.01, 426.02; 180/197

[56] References Cited

U.S. PATENT DOCUMENTS

| 3,862,781 | 1/1975 | King et al. ............................ 303/9.69 |
| 4,779,447 | 10/1988 | Rath ..................................... 303/100 X |
| 4,883,325 | 11/1989 | Shimanuki et al. ................. 303/100 X |
| 4,943,123 | 7/1990 | Takeda et al. ........................... 303/111 |
| 5,021,957 | 6/1991 | Yoshino et al. ................... 303/9.62 X |
| 5,127,713 | 7/1992 | Birkenbach ......................... 303/113.1 |
| 5,167,441 | 12/1992 | Schonlau et al. ...................... 303/92 |
| 5,246,276 | 9/1993 | Pajonk et al. ......................... 303/9.62 |
| 5,302,007 | 4/1994 | Morita et al. ........................ 303/9.73 |

FOREIGN PATENT DOCUMENTS

| 2411096 | 9/1975 | Germany ............................. 303/9.62 |
| 3440541 | 5/1986 | Germany ........................... 303/119.1 |
| 62-258843 | 11/1987 | Japan . |
| 195960 | 4/1989 | Japan . |
| 0197156 | 8/1989 | Japan ................................... 303/9.62 |
| 1301442 | 12/1989 | Japan . |
| 332968 | 2/1991 | Japan . |
| 2236156A | 3/1991 | United Kingdom . |

Primary Examiner—Robert J. Oberleitner
Assistant Examiner—Peter M. Poon

[57] ABSTRACT

A control method and an apparatus therefor, in which the braking force distribution to rear wheels is increased in a normal state, while the braking force distribution to the rear wheels is reduced to prevent the rear wheels from being locked in an early stage when the road surface is slippery. There are provided a pressure sensor (74) for detecting a master cylinder pressure, proportioning valves (57$_1$, 57$_2$) arranged in passages which connect a master cylinder and rear wheel cylinders and adapted to operate so that the ratios of the wheel cylinder pressures to the master cylinder pressure are low in a region where the master cylinder pressure is not lower than a predetermined pressure, normally-open switching valves (62, 63) by-passing the two valves, and a controller (71). The controller closes the switching valves to actuates the proportioning valves when the master cylinder pressure detected by the pressure sensor is not lower than a set pressure which lowers depending on the slipperiness of the road surface.

24 Claims, 23 Drawing Sheets

FIG. 1
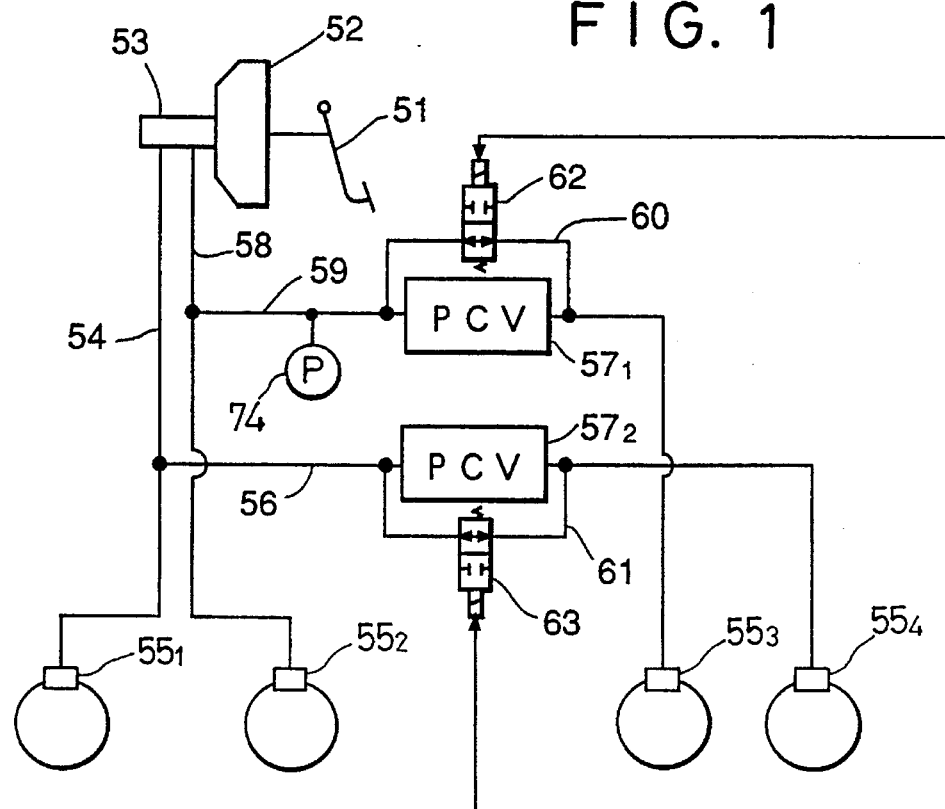
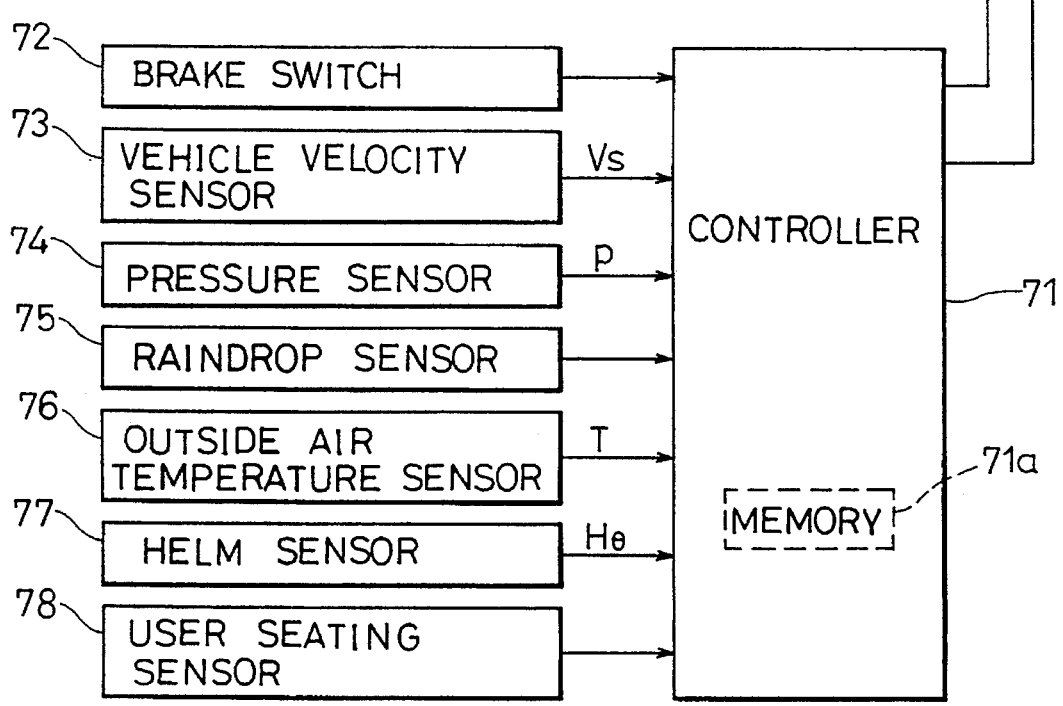

| WINDSHIELD WIPER SWITCH OPERATION PERIOD W \ OUTSIDE AIR TEMPERATURE T | S | M | N |
|---|---|---|---|
| S | BD | MD | MD |
| M | BD | MD | ZO |
| N | MD | ZO | ZO |

REAR WHEEL BRAKING FORCE CONTROL METHOD AND AN APPARATUS THEREFOR

This application is a continuation, of application Ser. No. 08/094,034 filed as PCT/JP92/01555, Nov. 27, 1992, now abandoned.

TECHNICAL FIELD

The present invention relates to a rear wheel braking force control method for controlling the distribution of front and rear wheel braking forces and an apparatus therefor, and more particularly, to a rear wheel braking force control method and an apparatus therefor, capable of reducing the share of the braking effect on the front wheel side while preventing the rear wheels from being locked.

BACKGROUND ART

In a typical braking system of a vehicle, a brake fluid pressure (hereinafter referred to as master cylinder pressure), which is produced in a master cylinder in response to a driver's depression of a brake pedal, is transmitted to wheel cylinders for the four wheels, whereby a braking force is applied to each wheel. If a large braking force acts on each wheel in response to a deep depression of the brake pedal, while the vehicle furnished with the braking system of this type is running, the deceleration of the vehicle becomes higher to reduce the rear wheel load, so that the ground contact performance of the rear wheels is lowered. If the master cylinder fluid pressure is distributed substantially equally to the front and rear wheel cylinders with the ground contact performance of the rear wheels thus lowered, the rear wheels are locked first, so that the braking stability of the vehicle is deteriorated.

In order to avoid the deterioration of the braking stability due to the rear-wheel-first locking, as is conventionally known, proportioning control valves (PCVs) are incorporated in the braking system. For example, each of two PCVs is disposed in the middle of a duct which connects each corresponding one of fluid pressure generator sections of the master cylinder and its corresponding rear wheel. The PCVs transmit the master cylinder pressure directly to the wheel cylinders for the rear wheels if the braking force is small. If the master cylinder pressure attains a level not lower than a set pressure, on the other hand, the PCVs lower the rate of increase of the fluid pressure transmitted to the rear wheel cylinders.

Thus, in the braking system furnished with the PCVs, the rear wheel braking force increases at a high rate as the front wheel braking force increases, in a small braking force region where the input fluid pressure to the PCVs is not higher than a set pressure. In a large braking force region where the input fluid pressure to the PCVs is higher than the set pressure, on the other hand, the rear wheel braking force increases at a low rate as the front wheel braking force increases. In other words, if a curve indicative of the braking force distribution characteristics of the braking system furnished with the PCVs is drawn on a graph whose axes of ordinate and abscissa represent the rear wheel braking force and front wheel braking force, respectively, then this braking force distribution curve is composed of a first straight line with a large inclination, which corresponds to the small braking force region, and a second straight line with a small inclination, which corresponds to the large braking force region.

The braking force distribution characteristics of the conventional braking system are set so that the braking force distribution ratio for the rear wheels is lower than in the case of a braking force distribution (ideal braking force distribution) such that the four wheels are simultaneously locked when the vehicle is braked. In this manner, the braking force stability is prevented from being lowered by the rear-wheel-first locking. Thus, the conventional braking force distribution curve is situated closer to the axis of abscissa than an ideal braking force distribution curve, that is, the rear wheel braking force always takes a value smaller than that of the ideal braking force. Meanwhile, the rear wheels cannot always be locked if they are subjected to a braking force of a value greater than a value which is determined by the conventional or ideal braking force distribution curve. In other words, even if there is enough room for the increase of the rear wheel braking force, the conventional braking system produces an overall braking force by increasing the share of the front wheel braking force correspondingly.

If the share of the front wheel braking force is excessively increased in this manner, wear of braking pads of a front wheel brake unit is increased, and besides, heat release from the brake increases. Accordingly, the braked vehicle is liable to nose diving, as well as a fade, such that the friction coefficient of the brake pads is suddenly reduced, and a vapor lock which is attributable to an increase of the brake fluid temperature. Thus, the braking stability is lowered.

If the share of the rear wheel braking force is increased, however, the rear wheels becomes liable to be locked, so that their locking should be prevented.

In consideration of these circumstances, technical ideas which are designed so that the rear wheel braking force distribution can be increased without causing the rear wheels to be locked are disclosed in Published Unexamined Japanese Patent Application Nos. 1-257652 (DE3742173, FR2624462, or GB2213543), 3-125657 (GB2236156 or DE3931858), and 3-208760 (DE4029332, GB2238092, or FR2654401). These prior art examples are provided with an anti-lock device and solenoid-operated valves for normally neutralizing the action of the proportioning control valves, so that the rear wheels can be prevented from locking while enjoying an increase of the braking force distribution thereto.

In these prior art examples, however, the proportioning control valves can be actuated only in case of trouble of the anti-lock device, so that the functions of the proportioning control valves cannot be effectively utilized. Thus, the braking force cannot be properly distributed to the rear wheels.

DISCLOSURE OF THE INVENTION

The object of the present invention is to provide a rear wheel braking force control method and an apparatus therefor, in which the braking force distribution to rear wheels can be increased in a normal state, while the braking force distribution to the rear wheels is reduced to prevent the rear wheels from being locked in an early stage when the road surface is slippery.

In order to achieve the above object, according to the present invention, there is provided a rear wheel braking force control method for a vehicle, for controlling the operation of solenoid-operated valves arranged in passages connecting a master cylinder and wheel cylinders for rear left and right wheels, the solenoid-operated valves serving to selectively make effective or ineffective the action of proportioning valves in the passages to control wheel cylinder pressures so that the rate of increase of the wheel cylinder pressures is lower than the rate of increase of a master cylinder pressure.

The method of the present invention comprises a road surface condition detecting process for detecting information associated with the slipperiness of a road surface, a process for detecting the degree of braking to which the vehicle is braked, a set braking degree determining process for setting a set braking degree on the basis of the information detected in the road surface condition detecting process and adjusting the set braking degree to a low level when the road surface is slippery, and a distribution control process for actuating the solenoid-operated valves so that the action of the proportioning valves is made ineffective when the braking degree detected in the braking degree detecting process is lower than the set braking degree, and actuating the solenoid-operated valves so that the action of the proportioning valves is made effective when the braking degree is equal to or higher than the set braking degree.

According to the present invention, moreover, there is provided a rear wheel braking force control apparatus for a vehicle, which has proportioning valves, arranged in passages connecting a master cylinder and wheel cylinders for rear left and right wheels, for controlling wheel cylinder pressures so that the rate of increase of the wheel cylinder pressures is lower than the rate of increase of a master cylinder pressure, solenoid-operated valves disposed in the passages for selectively making the pressure control action of the proportioning valves effective or ineffective, and control means for controlling the operation of the solenoid-operated valves.

The apparatus of the present invention comprises road surface condition detecting means for detecting information associated with the slipperiness of a road surface, and means for detecting the degree of braking to which the vehicle is braked. The control means sets a set braking degree on the basis of the information detected by the road surface condition detecting means, adjusts the set braking degree to a low level when the road surface is slippery, actuates the solenoid-operated valves so that the action of the proportioning valves is made ineffective when the braking degree detected by the braking degree detecting means is lower than the set braking degree, and actuates the solenoid-operated valves so that the action of the proportioning valves is made effective when the braking degree is equal to or higher than the set braking degree.

According to the present invention, the share of the front wheel braking force can be reduced by actuating the solenoid-operated valves so that the action of the proportioning valves is made ineffective when the detected braking degree is lower than the set braking degree so that there is enough room for the increase of the rear wheel braking force, and the solenoid-operated valves are actuated so that the action of the proportioning valves is made effective when the braking degree is not lower than the set braking degree so that there is no room for the increase of the rear wheel braking force. Accordingly, the rear wheels can be prevented from locking in an early stage by the function of the proportioning valves.

When the road surface is slippery, in particular, the aforesaid set braking degree is adjusted to a low level on the basis of the information detected by the road surface condition detecting means. When the road surface is slippery, therefore, the proportioning valves are actuated in an early stage to reduce the braking force distribution to the rear wheels, so that the rear wheels can be securely prevented from locking in an early stage.

Thus, according to the present invention, the share of the front wheel braking force can be reduced while effectively utilizing the function of the proportioning valves to prevent early locking of the rear wheels, and besides, the braking degree for the start of operation of the proportioning valves can be properly controlled depending on the road surface conditions, so that the control effect is marked. More specifically, the braking degree for the start of operation of the proportioning valves lowers depending on the slipperiness of the road surface. When the road surface is slippery, therefore, early locking of the rear wheels can be prevented by actuating the proportioning valves in an early stage, and when the road surface is not slippery, the braking force distribution to the rear wheels can be made relatively high, whereby the share of the front wheel braking force can be reduced. Accordingly, wear of a front wheel brake unit can be reduced so that the interval of replacement of brake pads can be extended. Also, heat release from the front wheel brake unit is reduced so that the anti-fade properties, and therefore reliability, are improved, and the possibility of nose diving can be lowered to improve the braking stability.

Preferably, in the apparatus of the present invention, rainfall detecting means is used as the road surface condition detecting means. By adjusting the set braking degree to a low level in rainy weather, early locking of the rear wheels, which is liable to be caused in rainy weather, can be prevented effectively.

Preferably, moreover, outside air temperature detecting means is used as the road surface condition detecting means. By adjusting the set braking degree to a low level when the outside air temperature is low, the braking force distribution to the rear wheels can be prevented from unduly increasing on a snow-covered road, frozen road, etc.

Preferably, road surface friction coefficient detecting means is used as the road surface condition detecting means. More accurate control can be achieved by adjusting the set braking degree to a low level when the road surface friction coefficient is low.

Further preferably, outside air temperature detecting means and windshield wiper operation period detecting means are used as the road surface condition detecting means. More accurate control can be achieved by determining the set braking degree by fuzzy inference based on the outside air temperature and windshield wiper operation period.

Further preferably, rear wheel load detecting means is provided so that control based on the load and road surface conditions can be effected to ensure more appropriate control by determining a reference level for the braking degree in accordance with a detected rear wheel load and then determining the set braking degree by compensating the reference degree on the basis of the information detected by the road surface condition detecting means.

Other features and advantages of the present invention will be apparent from the ensuing description.

BRIEF DESCRIPTION OF THE DRAWINGS

FIG. 1 is a block diagram showing a rear wheel braking force control apparatus according to a first embodiment of the present invention;

BEST MODE OF CARRYING OUT THE INVENTION

First, the aforementioned conventional braking system will be described in detail.

Figure 27:
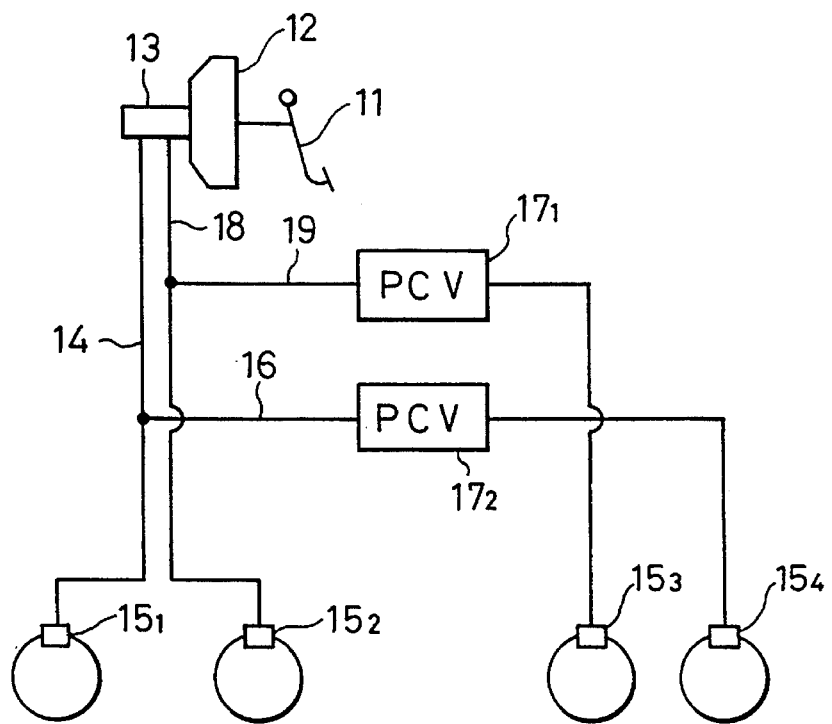
FIG. 27 is a schematic view showing a conventional braking system.

Referring to FIG. 27, the conventional X-piping braking system for general use in an FF (front-engine front-drive) car is provided with a brake pedal 11. A treading force on the brake pedal 11 is amplified by means of an intensifier 12, and then transmitted to a master cylinder 13 of a tandem. The master cylinder 13 includes two fluid pressure generator sections (not shown) for generating a brake fluid pressure corresponding to the depth of depression of the brake pedal 11. One of the fluid pressure generator sections is connected to a wheel cylinder $15_1$ for a front left wheel by means of a duct 14, and is also connected to a wheel cylinder $15_4$ for a rear right wheel by means of a duct 16 which diverges from the middle of the duct 14. A PCV $17_2$ is disposed in the middle of the duct 16. The other fluid pressure generator section is connected to a wheel cylinder $15_2$ for a front right wheel by means of a duct 18, and is also connected to a wheel cylinder $15_3$ for a rear left wheel by means of a duct 19 which diverges from the middle of the duct 18. A PCV $17_1$ is disposed in the middle of the duct 19.

The PCVs $17_1$ and $17_2$ are proportioning valves which directly transmit a fluid pressure produced in the master cylinder 13 unless the fluid pressure is higher than a set pressure. In a pressure range exceeding the set pressure, however, the PCVs $17_1$ and $17_2$ lower the rate of increase of the fluid pressure for the rear wheels, which accompanies an increase of the master cylinder pressure, thereby establishing a bent-line relationship between the front and rear wheel braking forces. These valves themselves are conventional ones.

Figure 29:
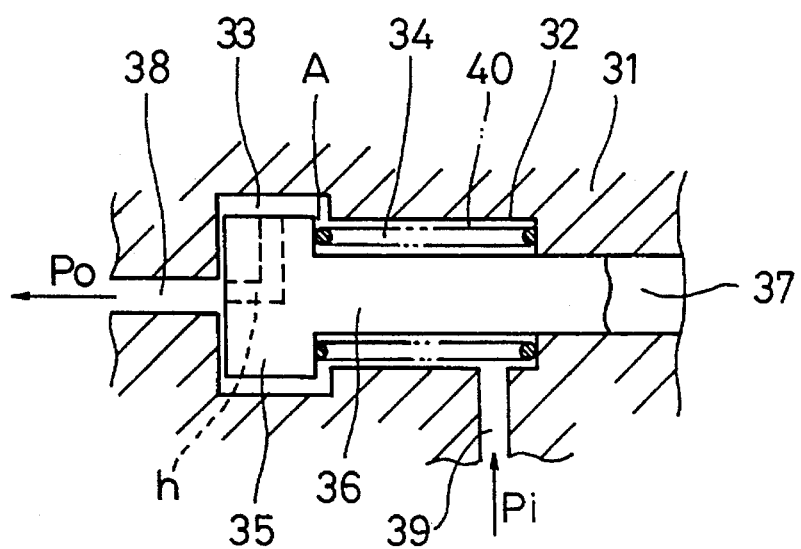
FIG. 29 is a sectional view illustrating an operating state of the proportioning valve.
Figure 30:
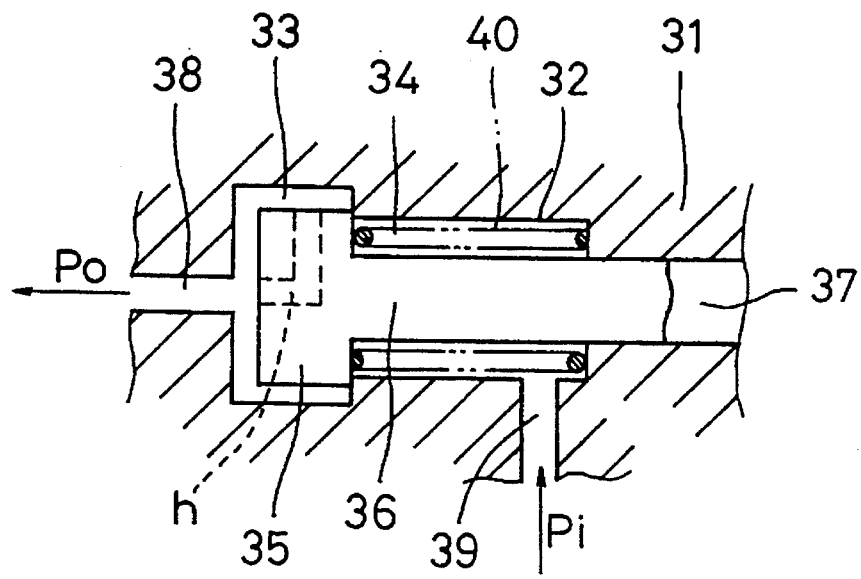
FIG. 30 is a sectional view illustrating another operating state of the proportioning valve.

As shown in FIGS. 29 and 30, each of the PCVs $17_1$ and $17_2$ includes a valve housing 31. Defined in the housing 31 is a stepped cylindrical valve chamber 32 which is formed of large- and small-diameter chambers 33 and 34. An outlet port 38, through which the fluid pressure to be supplied to the wheel cylinder concerned is taken out, is formed in the housing 31, opening to one end face of the cylinder chamber 33 in the housing 31. Also, an inlet port 39, through which the fluid pressure from the master cylinder 13 is taken in, is formed opening to one side of the peripheral surface of the cylinder chamber 34. A cylindrical valve plug 35, having a diameter a little greater than that of the cylinder chamber 34, is disposed in the cylinder chamber 33 for axial movement. A hole h is bored through the valve plug 35. Two opposite ends of the hole h open individually to the outer peripheral surface and the outlet-side end face of the plug 35 so that hydraulic oil can flow through the hole h. Further, a plunger 36, which is arranged integrally with the valve plug 35, extends along the valve axis in the cylinder chamber 34. One end portion of the plunger 36 is slidably fitted in a guide hole 37, which is bored through the housing 31.

Two opposite ends of a spring 40 set in the cylinder chamber 34 individually engage one end face of the valve plug 35 and that portion of the housing 31 which defines the end face of the chamber 34, thereby continually urging the plug 35 toward the outlet port 38. Normally, therefore, a gap A is defined between the peripheral edge portion of the valve plug 35 and the end portion of the cylinder chamber 34, so that the valve is open. Thus, an input fluid pressure Pi is transmitted as an output fluid pressure Po through the gap A and the hole h.

If the pressure receiving areas of the valve plug 35 on the sides of the outlet port 38 and the cylinder chamber 34 are So and Si, respectively, and if the urging force of the spring 40, input fluid pressure, and output fluid pressure are F, Pi, and Po, respectively, the valve plug 35 moves horizontally, depending on the relation between "Pi·Si+F" and "Po·So." In an initial state ("Po·So"<"Pi·Si+F"), as mentioned before, the gap A is opened by the urging force of the spring 40, so that the input fluid pressure Pi is delivered directly as the output fluid pressure Po. Thus, the output fluid pressure Po increases in accordance with the depth of depression of the brake pedal 11.

Figure 31:
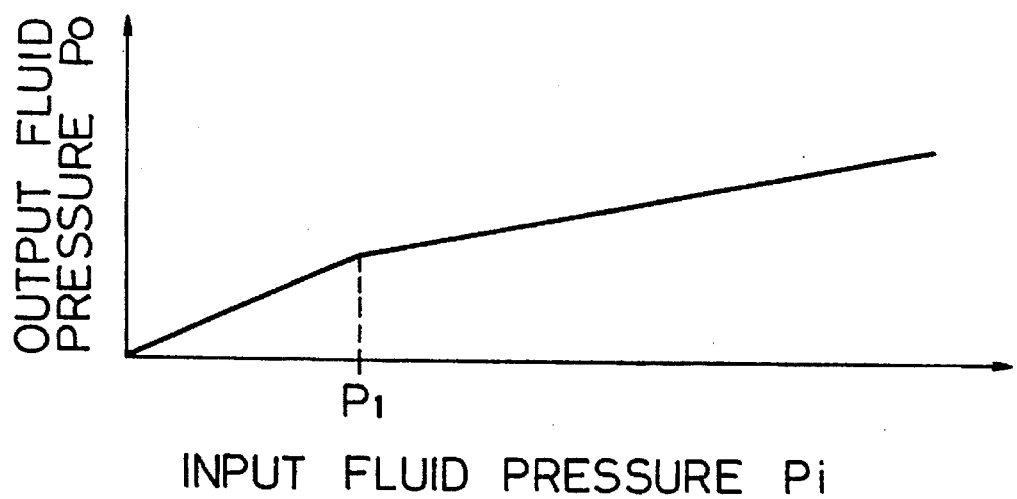
FIG. 31 is a diagram for illustrating the operation of the proportioning valve.

If the output fluid pressure Po is raised so that "Po·So" increases, "Po·So">"Pi·Si+F" is obtained when a set pressure P1 is attained by the input fluid pressure Pi. Accordingly, the valve plug 35 moves against the urging force of the spring 40 toward the cylinder chamber 34, so that the gap A is closed by the peripheral edge portion of the plug 35, as shown in FIG. 30, whereby the output fluid pressure Po is maintained. When the brake pedal 11 is further depressed to increase the input fluid pressure Pi so that "Po·So"<"Pi·Si+F" is obtained again, the gap A is opened again, as shown in FIG. 29, and the output fluid pressure Po increases corresponding to the increase of the pressure Pi. When the gap A is closed again as the output fluid pressure Po increases, the pressure P0 is maintained. In the region where the input fluid pressure Pi thus exceeds the set pressure P1, the gap A is repeatedly opened and closed, so that the output fluid pressure Po gently increases. Thus, in this region, the output fluid pressure Po changes in a manner such that its inclination with respect to the input fluid pressure Pi becomes smaller, as shown in FIG. 31. The magnitude of the set pressure P1 and the inclination of the output fluid pressure Po with respect to the input fluid pressure Pi, in the region where the input pressure Pi is higher than the set pressure P1, are unconditionally determined according to the mechanical constants of the PCVs, such as the urging force F of the spring 40, pressure receiving areas Si and So, etc.

Figure 28:
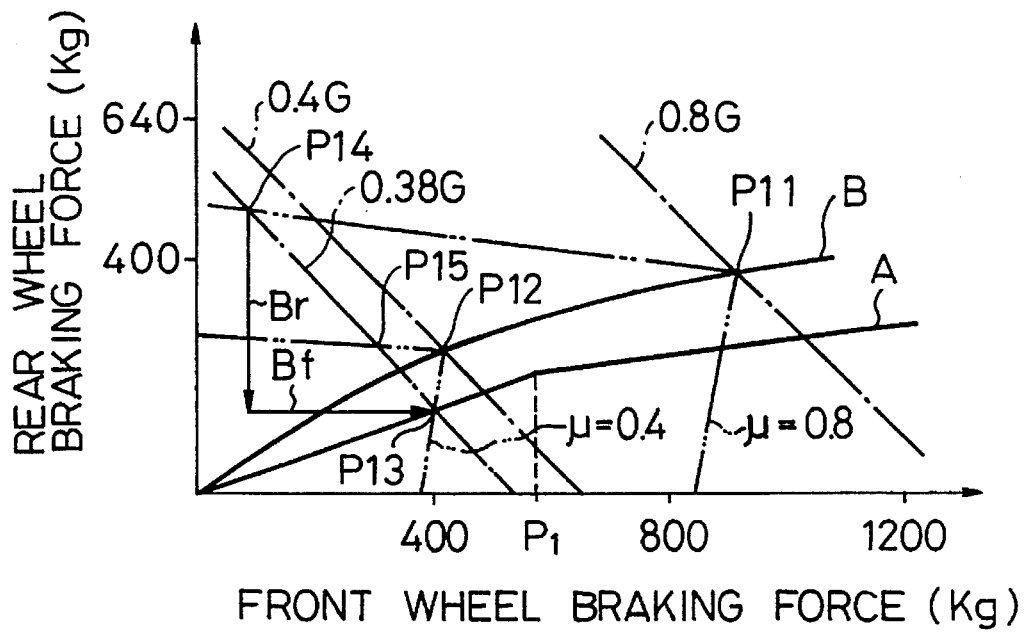
FIG. 28 is a diagram illustrating the liquid pressure distribution of the conventional braking system.

Referring now to FIG. 28, the relationship between a set braking force distribution, set for a vehicle in accordance with the mechanical requirements of the PCVs $17_1$ and $17_2$, and an ideal braking force distribution will be described. In FIG. 28, line A is a set braking force distribution line which, having a bend point, represents the set braking force distribution, and line B is an ideal braking force distribution curve representing the ideal braking force distribution which depends on the specifications of the vehicle. Here the ideal braking force distribution means a braking force distribution to the front and rear wheels such that the four wheels are simultaneously locked by braking.

An intersecting point P11 between the ideal braking force distribution curve B and a dashed line indicative of the deceleration of 0.8 G represents the braking force distribution which causes the front and rear wheels to be simultaneously locked by hard braking with the deceleration of 0.8 G. Likewise, an intersecting point P12 between the ideal braking force distribution curve B and a dashed line indicative of the deceleration of 0.4 G represents the braking force distribution which causes the front and rear wheels to be simultaneously locked by braking with the deceleration of 0.4 G. At every point on the dashed straight line for the deceleration of 0.8 G or 0.4 G, the same combined braking force (sum of braking forces for front and rear wheels) is required for the braking with the deceleration of 0.8 G or 0.4 G. A deceleration produced by ordinary braking ranges from 0.2 G to 0.3 G. The two-dot chain line represents the braking force to lock the front or rear wheels when the friction coefficient μ of a road surface is 0.8 or 0.4. Here the friction coefficient μ of a dry surface of an asphalt road is about 0.8 in fine weather. Specifically, the point P11 indicates the ideal braking force distribution for the front and rear wheels which are simultaneously locked on a road surface with the friction coefficient μ of 0.8 by hard braking with the deceleration of 0.8 G. Likewise, the point P12 indicates the ideal braking force distribution for the front and rear wheels which are simultaneously locked on a road surface with the friction coefficient μ of 0.4 by braking with the deceleration of 0.4 G.

As mentioned before, there is the ideal braking force distribution curve B which indicates that the front and rear wheels are simultaneously locked. Actually, however, the braking force for the rear wheels is adjusted to a smaller value than that of the ideal braking force. This is because the braking stability is lowered if the rear wheels are locked earlier than the front wheels. Thus, the set braking force is adjusted so that the straight line A for the rear wheel braking force never clears the ideal braking force distribution curve B.

If braking with the deceleration of 0.38 G is effected on a road surface with the friction coefficient μ of 0.4, a braking force distribution is made such that the combined braking force is represented by an intersecting point P13 between a straight line for 0.38 G and the set braking force distribution line A. Even though the rear wheel braking force is increased to the level of the braking force distribution at an intersecting point P15, however, the rear wheels are never locked. If braking with the deceleration of 0.38 G is effected on a road surface with the friction coefficient μ of 0.8, moreover, the rear wheels are never locked even though the rear wheel braking force is increased to the level of the braking force distribution at an intersecting point P14 between the straight line for 0.38 G and a straight line for the friction coefficient μ of 0.8. Thus, even when the braking is effected with the same deceleration, the front wheel braking force can be reduced by Bf, and the rear wheel braking force can be increased by Br beyond the level of the ideal braking force distribution, depending on the state of the road surface. In other words, although there is enough room for the increase of the rear wheel braking force, depending on the vehicle running conditions and road surface conditions, as long as the set braking force distribution line A is used, the combined braking force is produced by correspondingly increasing the front wheel braking force.

As also described before under the caption "BACKGROUND OF THE INVENTION," the aforementioned conventional braking systems have some problems, such as increased load on the front wheel braking unit. According to the alternative conventional examples which are arranged so that the rear wheel braking force distribution can be increased without causing the rear wheels to be locked, moreover, the functions of the proportioning valves cannot be effectively utilized, as mentioned before under the caption "BACKGROUND OF THE INVENTION."

The following is a description of a braking system furnished with a rear wheel braking force control apparatus according to a first embodiment of the present invention.

As shown in FIG. 1, the braking system comprises a brake pedal 51, an intensifier 52, and a master cylinder 53 (which correspond to the elements 11, 12 and 13, respectively, shown in FIG. 27), wheel cylinders $55_1$, $55_2$, $55_3$ and $55_4$ (which correspond to the elements $15_1$, $15_2$, $15_3$ and $15_4$, respectively), ducts 54, 56, 58 and 59 (which correspond to the elements 14, 16, 18 and 19, respectively), and PCVs $57_1$ and $57_2$ (which correspond to the elements $17_1$ and $17_2$, respectively). The ducts constitute a first passage which connects the master cylinder 53 and the wheel cylinders $55_3$ and $55_4$ for rear left and right wheels.

Thus, in this braking system, which comprises the brake pedal 51, a treading force on the brake 51 is amplified by means of the intensifier 52, and then transmitted to the master cylinder 53 of a tandem. The master cylinder 53 includes two fluid pressure generator sections (not shown) for generating a brake fluid pressure corresponding to the depth of depression of the brake pedal 51. One of the fluid pressure generator sections is connected to the wheel cylinder $55_1$ for a front left wheel by means of the duct 54, and is also connected to the wheel cylinder $55_4$ for the rear right wheel by means of the duct 56, which diverges from the middle of the duct 54, and the PCV $57_2$. The other fluid pressure generator section is connected to the wheel cylinder $55_2$ for a front right wheel by means of the duct 58, and is also connected to the wheel cylinder $55_3$ for the rear left wheel by means of the duct 59, which diverges from the middle of the duct 18, and the PCV $57_1$.

The PCVs $57_1$ and $57_2$ are proportioning valves which serve to directly transmit the master cylinder pressure when the braking force is relatively small, and to lower the rate of increase of the rear wheel cylinder pressure compared with that of the master cylinder pressure when the master cylinder pressure exceeds a set pressure. Since these valves are constructed in the same manner as the one described with reference to FIGS. 27 to 31, a detailed description of the valves is omitted.

A by-pass pipe 60 is provided between the upper- and lower-course sides of the duct 59 with respect to the PCV $57_1$. Likewise, a by-pass pipe 61 is provided between the upper- and lower-course sides of the duct 56 with respect;to the PCV $57_2$. The by-pass pipes 60 and 61 are provided with PCV by-pass valves 62 and 63, respectively, formed of normally-open solenoid-operated valves.

The on-off operation of the PCV by-pass valves 62 and 63 is controlled by means of a controller 71 as control means, which is formed of a microcomputer and its peripheral circuit. The controller 71 is connected with a brake switch 72 for outputting an on-signal in response to the depression of the brake pedal 51 by means of a driver, a vehicle velocity sensor 73 for detecting a vehicle velocity Vs, a pressure sensor 74 for detecting a braking pressure P or fluid pressure delivered from the master cylinder 53, a raindrop sensor 75 for detecting rainfalls. The raindrop sensor 75 is adapted to deliver an off-signal in fine weather, and an on-signal in rainy weather. The controller 71 is further connected with an outside air temperature sensor 76 for detecting an air temperature T, a helm sensor 77 for detecting a helm Hθ of a steering wheel, and a user seating sensor 78 attached to each seat and used to detect a user's seating. The raindrop sensor 75 and the air temperature sensor 76 constitute road surface condition detecting means. Although the pressure sensor 74 is attached to one line of a two-way duct according to the present embodiment, it may alternatively be attached to each line.

Figure 2:
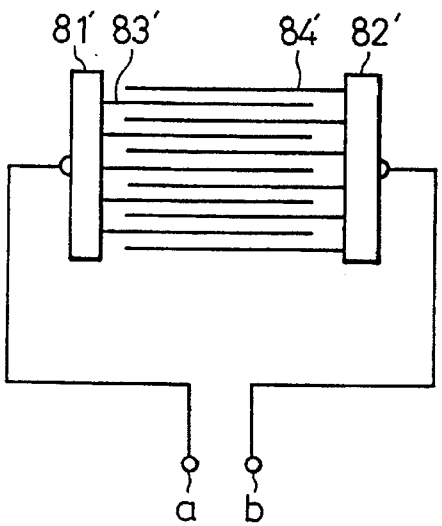
FIG. 2 is a schematic view of a raindrop sensor shown as a block in FIG. 1.

Referring now to FIG. 2, the raindrop sensor 75 will be described in detail.

In FIG. 2, numerals 81' and 82' denote electrodes which face each other. Comb-shaped conductors 83' extend from the one electrode 81' toward the other electrode 82', while comb-shaped conductors 84' extend from the electrode 82' toward the electrode 81'. Each conductor 83' is located between its corresponding pair of conductors 84'. The raindrop sensor 75, which is used with voltage applied between the electrodes 81' and 82', detects a rainfall when it is subjected to a current flow which is attributable to a short circuit caused between terminals a and b by raindrops.

Figure 5:
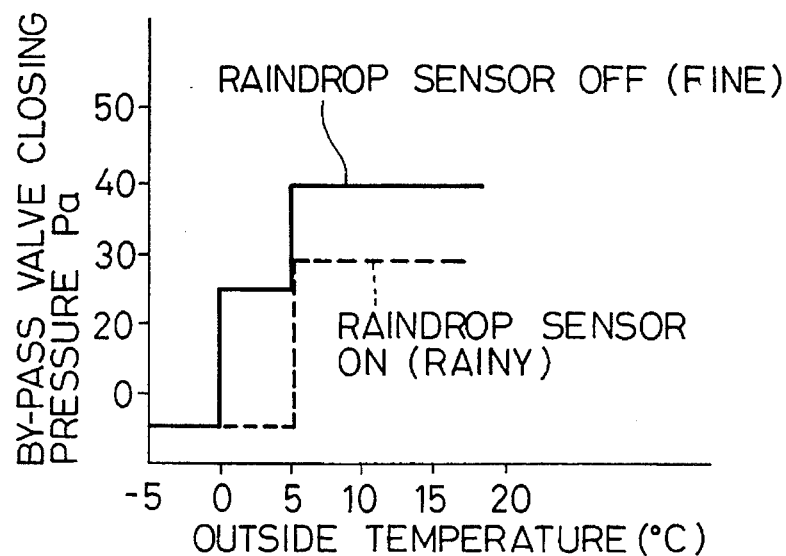
FIG. 5 is a diagram illustrating outside air temperature compensation in the same control apparatus.
Figure 6:
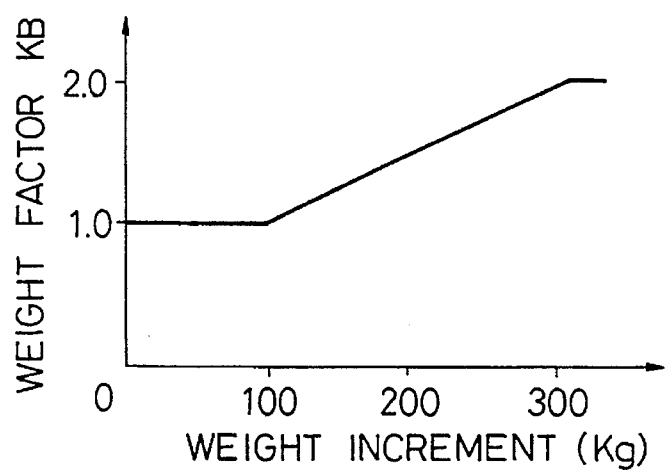
FIG. 6 is a diagram illustrating load compensation in the same control apparatus.
Figure 7:
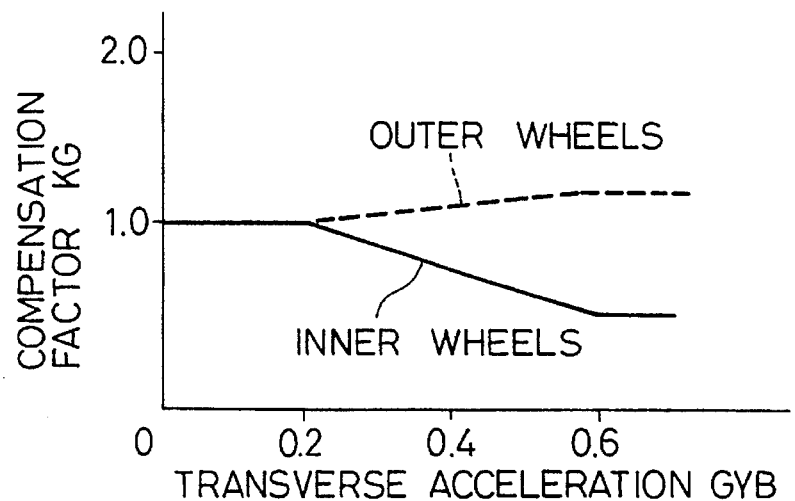
FIG. 7 is a diagram illustrating transverse acceleration compensation in the same control apparatus.
Figure 8:
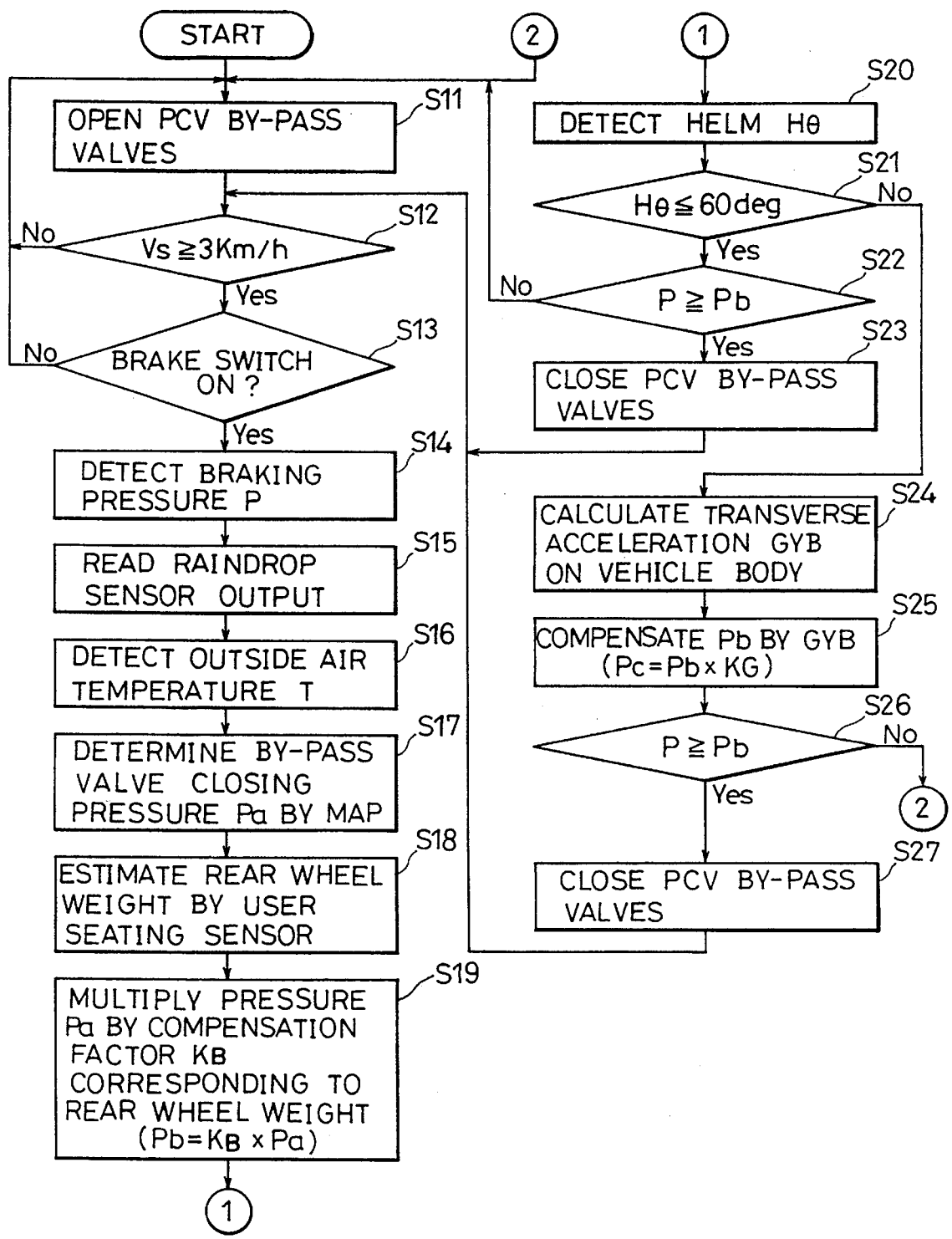
FIG. 8 is a flow chart for illustrating the operation of the same control apparatus.

The controller 71, which is provided with memory means 71a for storing maps shown in FIGS. 5 to 7, executes the control shown in the flow chart of FIG. 8. More specifically, when a set pressure (Pb or Pc mentioned later) is attained by the pressure detected by the pressure sensor 74, the controller 71 closes the PCV bypass valves 62 and 63, thereby causing the PCVs $57_1$ and $57_2$ to fulfill their valve functions.

Thus, in the present embodiment, the PCV by-pass valves 62 and 63, formed of normally-open solenoid-operated valves are disposed in the by-pass pipes 60 and 61 which bypass the PCVs $57_1$ and $57_2$ attached to the braking system, so that the master cylinder pressure is transmitted directly to the wheel cylinders for the rear wheels before the set pressure is attained by the braking pressure detected by the pressure sensor 74, and that the PCV by-pass valves 62 and 63 are closed, thereby causing the PCVs $57_1$ and $57_2$ to fulfill their functions, when the set pressure is exceeded by the braking pressure detected by the pressure sensor 74.

Figure 3:
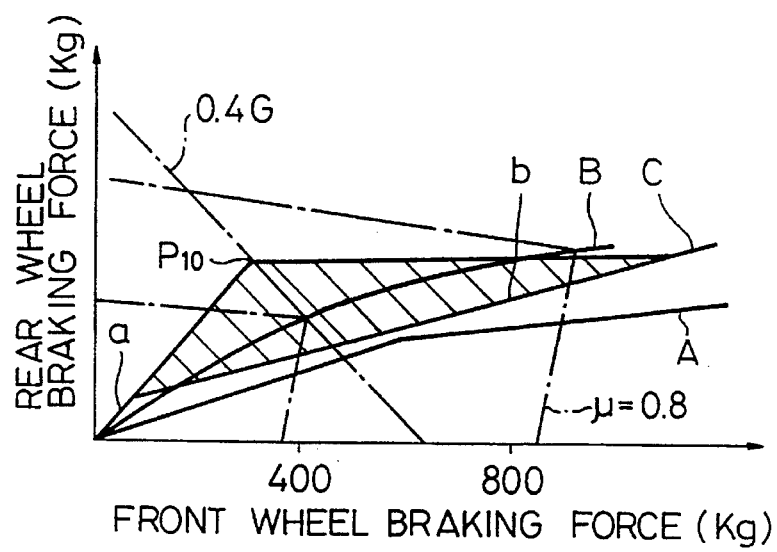
FIG. 3 is a diagram illustrating the braking force distribution for front and rear wheels according to the control apparatus of FIG. 1.

The hatched region of FIG. 3 represents a basic range of the rear wheel braking force which is controllable by means of the apparatus of the present embodiment. Thus, according to the present embodiment, the rear wheels can be subjected to a higher braking force than the braking force represented by the ideal braking force distribution curve B. Further, a bent line C formed of straight lines a and b represents a braking force distribution obtained when the PCV by-pass valves 62 and 63 are kept closed. The leading edge portion of the line C, represented by the straight lines a, is steeper than that of the bent line A (FIG. 28) which represents the braking force distribution characteristic of the conventional apparatus. This is so because the ratio of the pressure receiving areas of the wheel cylinders $55_3$ and $55_4$ for the rear wheels to the pressure receiving areas of the wheel cylinders $55_1$ and $55_2$ for the front wheels is as high as about 50 to 50, which is higher than in the conventional case. The braking force distribution characteristics observed at the bend point and after the bend point is passed are attributable to the structural arrangement of the PCVs $57_1$ and $57_2$.

Figure 4:
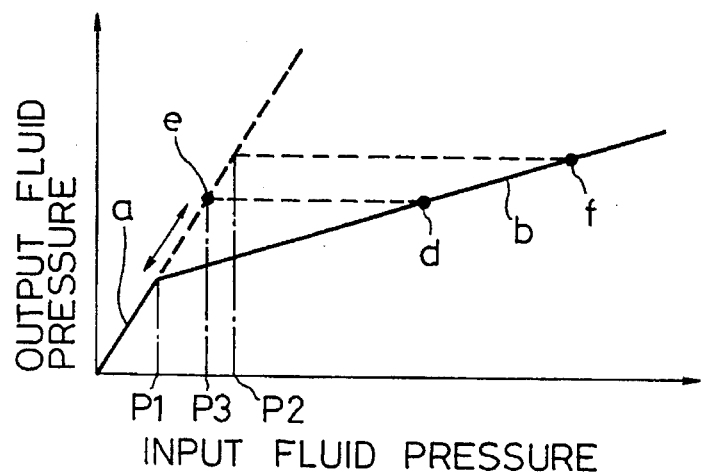
FIG. 4 is a diagram illustrating a rear-wheel braking force control range according to the same control apparatus.

As shown in FIG. 4, the bent line C of FIG. 3 also represents the input-output characteristics of the PCVs $57_1$ and $57_2$. When the PCV by-pass valves 62 and 63 are closed, the output fluid pressure of each of these valves is determined by the straight line a before the input fluid pressure of each of the PCVs $57_1$ and $57_1$ attains P1, and by the straight line b when the input fluid pressure exceeds P1. If the input fluid pressure is increased with the valves 62 and 63 open, on the other hand, the output fluid pressure increases in the manner indicated by an extension (given by broken line) of the straight line a even when P1 is exceeded by the input fluid pressure. Thus, if the PCV by-pass valves 62 and 63 are closed when P2, which is higher than P1, is attained by the input fluid pressure, for example, the output fluid pressure increases along the extension of the straight line a until the input fluid pressure, after exceeding P1, attains P2. When the input fluid pressure exceeds P2, the output fluid pressure is kept at a point f corresponding to a broken line ef which passes through a point e on the extension corresponding to P2 and crosses the straight line b. When the input fluid pressure exceeds a value corresponding to the intersecting point f between the broken line ef and the straight line b, moreover, the output fluid pressure increases along the straight line b. The output fluid pressure is thus kept in the input fluid pressure region corresponding to the broken line error the following reason. If the output fluid pressure Po is higher than a value for a normal control state Indicated by the straight line b, "Po·So">"Pi·Si+F" is obtained, so that the gap A is closed, as shown in FIG. 30.

Referring now to FIG. 8, the operation of the control apparatus according to the first embodiment of the present invention, constructed in the aforesaid manner, will be described.

First, the controller 71 opens the PCV by-pass valves 62 and 63, thereby preventing the PCVs $57_1$ and $57_2$ from fulfilling their functions. In order to determine whether the vehicle is practically running or not, moreover, the controller 71 determines whether or not the vehicle velocity Vs detected by means of the vehicle sensor 73 is not lower than 3 km/h. If it is concluded that the vehicle velocity Vs is not lower than 3 km/h, the controller 71 further determines whether the brake switch 72 is on or not (Steps S11 to S13).

If the result of decision in Step S13 is positive (YES), the controller 71 successively reads the braking pressure detected by the pressure sensor 74, the output of the raindrop sensor 75, and the outside air temperature T detected by the outside air temperature sensor 76 (Steps S14 to S16).

Referring to the map of FIG. 5, the controller 71 then obtains a by-pass valve closing pressure Pa above which the PCV by-pass valves 62 and 63 are closed depending on the outside air temperature T and rainfall conditions. In FIG. 5, a map represented by full line is referred to when the output of the raindrop sensor 75 is off (fine), and a map represented by broken line is referred to when the output of the raindrop sensor is on (rainy). In fine weather, the road surface is less slippery, so that the closing pressure Pa is set on a high level. If the outside air temperature T is low, moreover, the road surface is more slippery, so that the closing pressure Pa is set on a low level. Thus, in fine weather, the closing pressure Pa is changed in three stages with points of transition corresponding to the outside air temperatures of 0° C. and 5° C. In rainy weather, the closing pressure is changed in two stages with a point of transition corresponding to the outside air temperature of 5° C. Accordingly, the more slippery the road surface (or the lower the locking limit), the lower the closing pressure Pa is. The maximum value (40 kg/cm$^2$) of the closing pressure Pa is set so as to correspond to the braking pressure at a point P10 of FIG. 3.

Subsequently, an increment in weight caused by users and detected by means of the user seating sensor 78 is estimated, and a weight factor $K_B$ is obtained with reference to the map of FIG. 6 (Step S18). The weight increment is obtained in the following manner. A piezoelectric device is previously embedded in each seat, and a user's seating is discriminated in accordance with a detection signal from this device. Then, the product of the weight of users in the front seats and a first predetermined ratio (%) and the product of the weight of users in the rear seats and a second predetermined ratio (%) are obtained, and the sum of the two products are calculated as the weight increment. As seen from the map of FIG. 6, the greater the weight increment, the higher the weight factor $K_B$ becomes. This is because the greater a load on the rear wheels, the less easily the rear wheels can be locked.

Subsequently, the controller 71 multiplies the closing pressure Pa obtained in Step S17 by the factor $K_B$ obtained with reference to the map of FIG. 6, thereby obtaining a load-compensated closing pressure Pb (Step S19). Since the load is compensated in this manner, the greater the rear wheel load, that is, the less easily the rear wheels can be locked (or the higher the locking limit), the higher the closing pressure Pb becomes.

Then, the controller 71 reads the helm Hθ detected by the helm sensor 77, and determines whether or not the helm Hθ is not higher than 60 deg. (Steps S20 and S21). If the helm Hθ is not higher than 60 deg., it is further determined whether or not the braking pressure P detected by means of the pressure sensor 74 is not lower than the load-compensated closing pressure Pb (Step S22). If the braking pressure P is lower than the value Pb, the process of Step S11 and the subsequent processes are repeated. If the braking pressure P is not lower than the value Pb, the PCV by-pass valves 62 and 63 are closed (Step S23). If it is concluded in Step S21 that the helm Hθ is higher than 60 deg., a transverse acceleration $G_{YB}$ acting on the body of the vehicle is calculated on the basis of the vehicle velocity V detected by means of the vehicle velocity sensor 73 and the helm Hθ detected by means of the helm sensor 77 (Step S24).

Subsequently, a compensation factor $K_G$ corresponding to the transverse acceleration $G_{YB}$ thus calculated is obtained with reference to a map shown in FIG. 7. For example, the compensation factor $K_G$ is set so that its values on the outer- and inner-wheel sides increase and decrease, respectively, when the transverse acceleration $G_{YB}$ ranges from 0.2 G to 0.6 G, and are kept at the value of 0.6 G when the transverse acceleration $G_{YB}$ is higher than 0.6 G. This is done in consideration of the fact that if the vehicle turns more sharply, then the load correspondingly moves to the outer-wheel side so that the outer wheels can be locked less easily than the inner wheels. Then, the load-compensated closing pressure Pb calculated in Step S19 is multiplied by the compensation factor $K_G$ obtained in this manner, whereby a transverse-G-compensated closing pressure Pc is calculated (Step S25). More specifically, the transverse G is compensated in a manner such that the more sharply the vehicle turns, the higher the closing pressure on the outer-wheel side corresponding to the higher locking limit is, and the lower the closing pressure on the inner-wheel side corresponding to the lower locking limit is.

The inner-wheel-side valve, out of the PCV by-pass valves 62 and 63, is closed when the braking pressure P detected by means of the pressure sensor 74 attains the closing pressure for the inner wheels, and the outer-wheel side valve, out of the PCV by-pass valves 62 and 63, is closed when the braking pressure P attains the closing pressure for the outer wheels, thereafter (Steps S26 and S27). Thus, the braking force on the inner wheels, which are more easily locked when the vehicle turns, is restrained from increasing by closing the inner-wheel-side PCV by-pass valves earlier than the outer-wheel-side PCV by-pass valves while the vehicle is turning.

Figure 9:
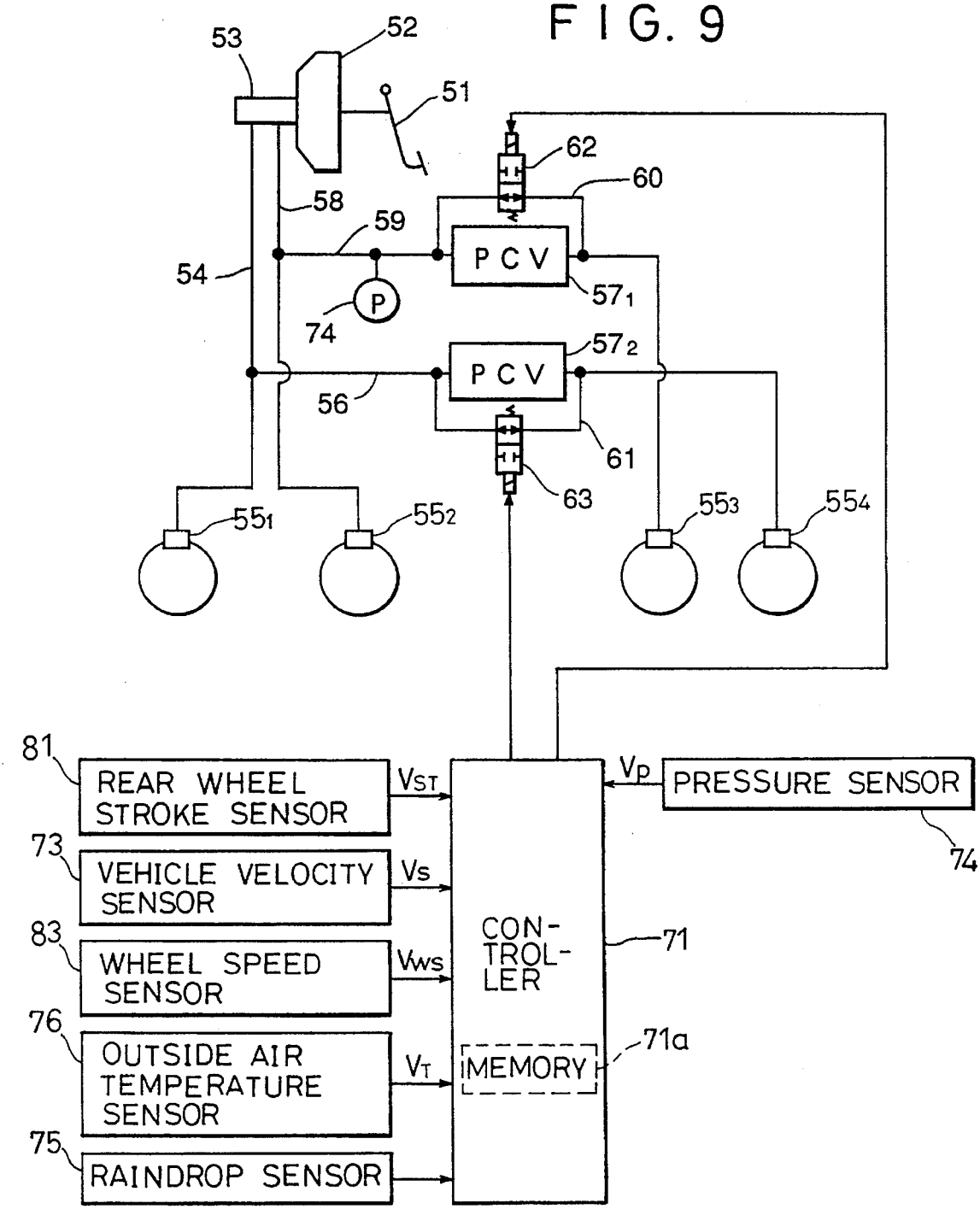
FIG. 9 is a block diagram showing a rear-wheel braking force control apparatus according to a second embodiment of the present invention.
Figure 10:
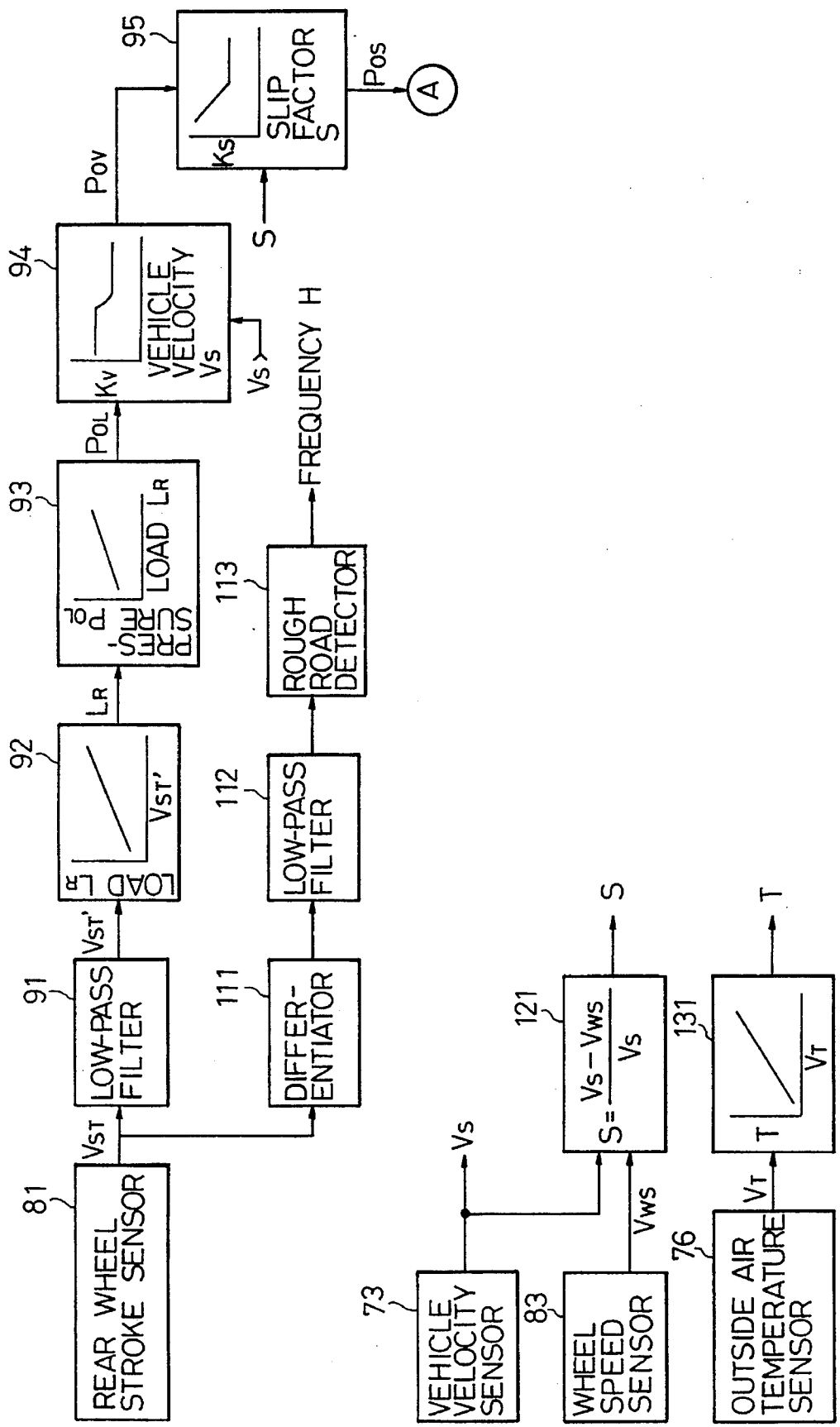
FIG. 10 is a block diagram showing a part of control contents of the apparatus of FIG. 9.
Figure 11:
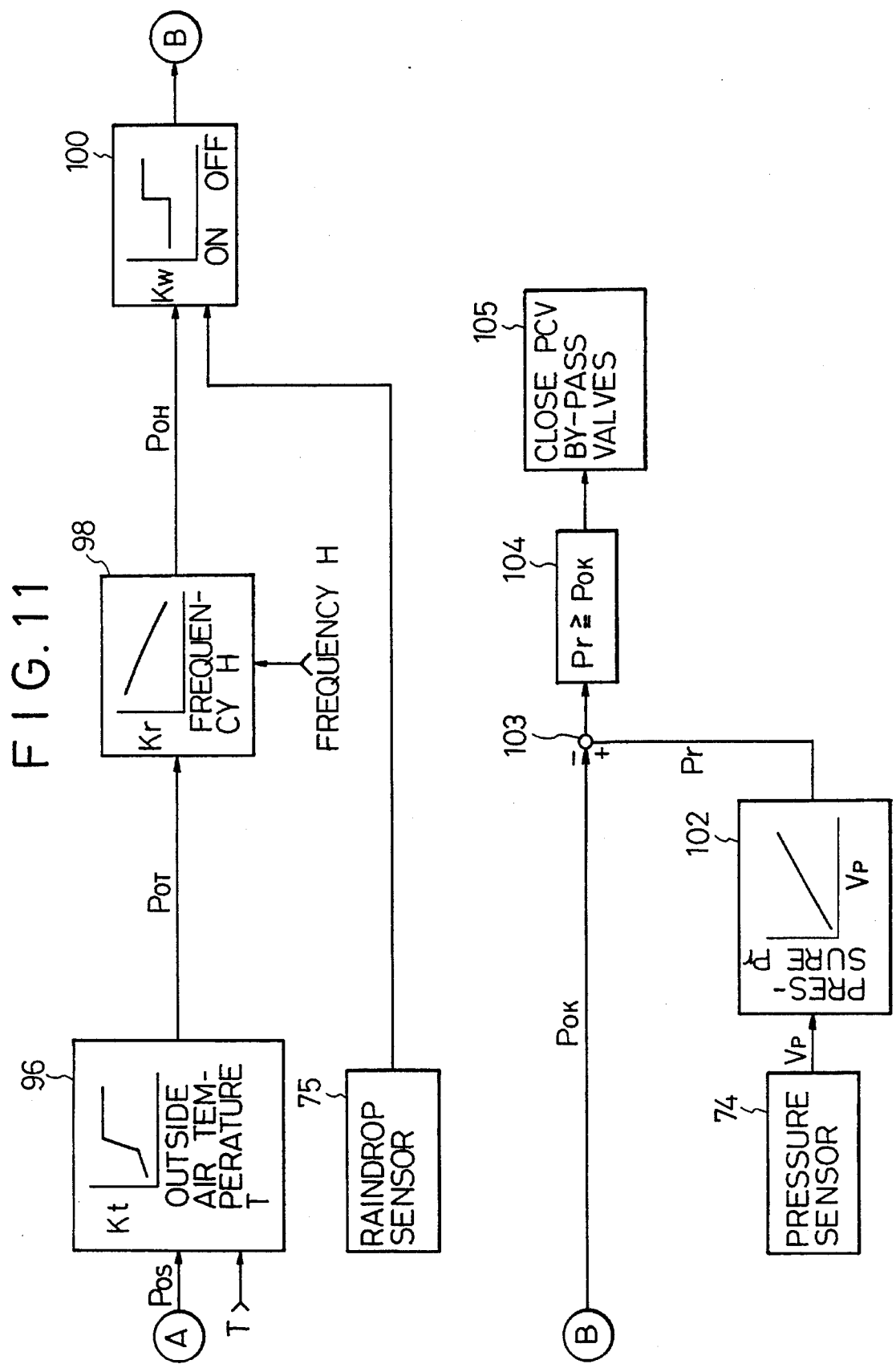
FIG. 11 is a block diagram showing the remaining part of the control contents partially shown in FIG. 10.

Referring now to FIGS. 9 to 11, a rear wheel braking force control apparatus according to a second embodiment of the present invention will be described.

The basic configuration of the apparatus of the present embodiment is identical with that of the first embodiment. In FIG. 9, like numerals are used to designate common elements corresponding to the elements shown in FIG. 1, and a detailed description of those common elements is omitted. In the first embodiment, the pressure value set on the basis of the raindrop sensor output, indicative of a rainfall, and the outside air temperature is compensated in accordance with the rear wheel load and the transverse G, whereby the by-pass valve closing pressure is set. The present embodiment differs from the first embodiment mainly in that the pressure value obtained on the basis of the rear wheel load is compensated in accordance with the vehicle velocity, slip factor, outside air temperature, degree of road roughness, and occurrence of a rainfall, whereby the by-pass valve closing pressure is set.

In connection with this difference, the apparatus of the present embodiment is furnished with neither the helm sensor 77 nor the user seating sensor 78 shown in FIG. 1, but comprises a rear wheel stroke sensor 81 for detecting the stroke of the rear wheels and a wheel speed sensor 83 for detecting a wheel speed $V_{WS}$ of the driven wheels (rear wheels). The rear wheel stroke sensor 81 delivers a stroke signal $V_{ST}$, which increases as the rear wheel load increases, to the controller 71, while the wheel speed sensor 83 supplies the detected wheel speed $V_{WS}$ to the controller 71. The wheel speed sensor 73 detects the vehicle velocity $V_S$ by detecting the rotational rate of the vehicle drive system, the vehicle velocity $V_S$ substantially corresponding to the rotational rate of the driving wheels.

Referring now to FIGS. 10 and 11, the contents of control by means of the controller 71 will be described.

in FIGS. 10 and 11, the stroke signal $V_{ST}$ detected by the rear wheel stroke sensor 81 is supplied to a low-pass filter 91. The high-frequency fluctuation component of the signal $V_{ST}$ is removed in this filter, and is supplied to a rear wheel load estimator section 92, as a stroke signal $V_{ST}'$ which increases with the increase of the rear wheel load. The rear wheel load $L_R$, obtained in response to the signal $V_{ST}'$ by means of the rear wheel load estimator section 92, is delivered to a closing pressure setter section 93 for setting a closing pressure $P_{OL}$ which is used to close the PCV by-pass valves 62 and 63. The closing pressure $P_{OL}$ is set so that the greater the rear wheel load, the higher it is. This is because the rear wheels are less liable to lock if the rear wheel load becomes greater, as mentioned before.

The closing pressure $P_{OL}$ set by means of the closing pressure setter section 93, along with the vehicle velocity $V_S$ from the vehicle velocity sensor 73, is delivered to a vehicle velocity compensator section 94. In the compensator section 94, the closing pressure $P_{OL}$ from the closing pressure setter section 93 is multiplied by a coefficient Kv, which varies depending on the vehicle velocity Vs, and the resulting value or compensated closing pressure $P_{OV}$ is delivered to a slip factor compensator section 95. The coefficient Kv is set so that the higher the vehicle velocity Vs, the lower it is. This is intended to leave a margin for stability, in consideration of the fact that the higher the vehicle velocity, the greater the influence of lowered stability, attributable to an excessively large rear wheel braking force, is.

In the slip factor compensator section 95, the vehicle-velocity-compensated closing pressure $P_{OV}$ is multiplied by a coefficient $K_S$, which varies depending on a slip factor S computed by means of a slip factor computing section (mentioned later), whereby the closing pressure $P_{OV}$ is compensated. The illustrated map is stored in the memory means 71a of the controller 71. The higher the slip factor S, the more easily the rear wheels are locked. In the map, therefore, the coefficient $K_S$ is set so that it is lowered as the slip factor becomes higher, and is kept at a fixed value when a certain value is exceeded by the slip factor S.

A slip-factor-compensated closing pressure $P_{OS}$, outputted from the slip factor compensator section 95, is delivered to an outside air temperature compensator section 96 shown in FIG. 11, and the compensated closing pressure $P_{OS}$ is multiplied by a coefficient Kt which varies depending on the outside air temperature T detected by the outside air temperature sensor 76. As seen from the map of the block 96, the coefficient Kt is adjusted to a small value in the region where the outside air temperature T is low, and to a large value in the region where the outside air temperature T is high. This is done because the lower the outside air temperature T, the more slippery the road surface is, and the more easily the rear wheels is locked.

An air-temperature-compensated closing pressure $P_{OT}$ is delivered to a rough road compensator section 98, whereupon it is multiplied by a coefficient Kr. The compensator section 98 is supplied with a level frequency H from a rough road detector section, which is indicative of the roughness of the road, and will be mentioned later. The higher the level frequency H, the higher the degree of roughness of the road is, and the more easily the rear wheels are locked. As seen from the map of the block 98, therefore, the coefficient Kr is set so that the higher the frequency H, the lower it is.

A rough-road-compensated closing pressure $P_{OH}$ is delivered to a wet road compensator section 100, whereupon it is multiplied by a coefficient $K_W$, thereby providing a closing pressure $P_{OK}$. The wet road compensator section 100 is supplied with the output signal from the raindrop sensor 75. As seen from the map of the block 100, the coefficient $K_W$ is set so as to be changed to a smaller value when the output of the raindrop sensor 75 is on (indicative of a rainfall). This is because the rear wheels are liable to be locked on a rain-wet road such that the raindrop sensor 75 is turned on.

An electrical signal $V_P$, which corresponds to the brake fluid pressure detected by means of the pressure sensor 74, is delivered to a converter section 102, whereupon it is converted into a brake fluid pressure Pr. In a subtracter section 103, the closing pressure $P_{OK}$ delivered from the wet road compensator section 100 is subtracted from the brake fluid pressure Pr. A value indicative of the result of this subtraction is delivered to a discriminator section 104, whereupon it is determined whether or not there is a relation $Pr \geq P_{OK}$. If the decision result is positive, a processor section 105 is activated to close the PCV by-pass valves 62 and 63.

As shown in FIG. 10, the signal $V_{ST}$ from the rear wheel stroke sensor 81 is delivered to a differentiator section 111 to be differentiated thereby. The output of the differentiator section 111 is delivered to a low-pass filter 112, whereupon its high-frequency component is cut. Further, the output of the low-pass filter 112 is delivered to a rough road detector section 113, whereupon the number of times a predetermined level is exceeded within a predetermined period of time is calculated as the frequency H which corresponds to the level of roughness of the road. The frequency H is delivered to the aforesaid rough road compensator section 98. Also, the vehicle velocity Vs corresponding to the speed of the driving wheels, detected by means of the vehicle velocity sensor 73, and the wheel speed $V_{WS}$ of the driven wheels, detected by means of the wheel speed sensor 83, are supplied to a slip factor calculator section 121, whereupon the slip factor S (=Vs–$V_{WS}$)/Vs) is calculated. The calculated slip factor S is delivered to the aforesaid slip factor compensator section 95. A voltage $V_T$, which is proportional to the outside air temperature T from the outside air temperature sensor 76, is delivered to a converter section 131, whereupon it is converted into the outside air temperature T, which is delivered to the outside air temperature compensator section 96.

The following is a description of the operation of the rear wheel braking force control apparatus according to the present embodiment constructed in this manner.

The rear wheel stroke signal $V_{ST}$ delivered from the rear wheel stroke sensor 81 is applied to the low-pass filter 91, whereupon its high-frequency pressure fluctuation is cut. Then, the signal $V_{ST}$ is applied to the rear wheel load estimator section 92. In this estimator section 92, the load $L_R$ acting on the rear wheels is estimated. The rear wheel load $L_R$ is delivered to the closing pressure estimator section 93, whereupon the closing pressure $P_{OL}$ for closing the PCV by-pass valves 62 and 63, which corresponds to the rear wheel load $L_R$, is obtained. Thereafter, the closing pressure $P_{OL}$ is multiplied successively by the coefficients Kv, Ks, Kt, Kr and $K_W$ in the vehicle velocity compensator section 94, slip factor compensator section 95, outside air temperature compensator section 96, rough road compensator section 98, and wet road compensator section 100, respectively. By doing this, the final closing pressure $P_{OK}$ is obtained.

If the discriminator section 104 concludes that the brake fluid pressure Pr detected by means of the pressure sensor 74 is equal to or higher than the closing pressure $P_{OK}$, the PCV by-pass valves 62 and 63 are closed, and processing for activating the PCVs 57₁ and 57₂ is executed. As a result, if the PCV by-pass valves 62 and 63 are closed at the point e (FIG. 4) which corresponds to the input fluid pressure P3 (=$P_{OK}$), for example, the output fluid pressure is kept at the pressure at the point e even though the input fluid pressure increases thereafter. After the input fluid pressure becomes equal to or higher than the pressure at the point f, thereafter, the output fluid pressure increases along the straight line b. The output fluid pressure is kept in this manner because a relation Po·So>(Pi·Si+F) is maintained, as shown in FIG. 30, since the output fluid pressure Po is higher than the value for the normal control state, as indicated by the straight line b.

According to the present embodiment, as described above, the closing pressure $P_{OK}$ is compensated in accordance with the slipperiness of the road surface by multiplying an input pressure signal by its corresponding one of the coefficients Ks, Kt and Kw in each of the sections including the slip factor compensator section 95, outside air temperature compensator section 96, and wet compensator section 100. On a road surface which is liable to cause the rear wheels to lock, therefore, the closing pressure $P_{OK}$ is reduced to prevent the rear wheels from locking.

Figure 12:
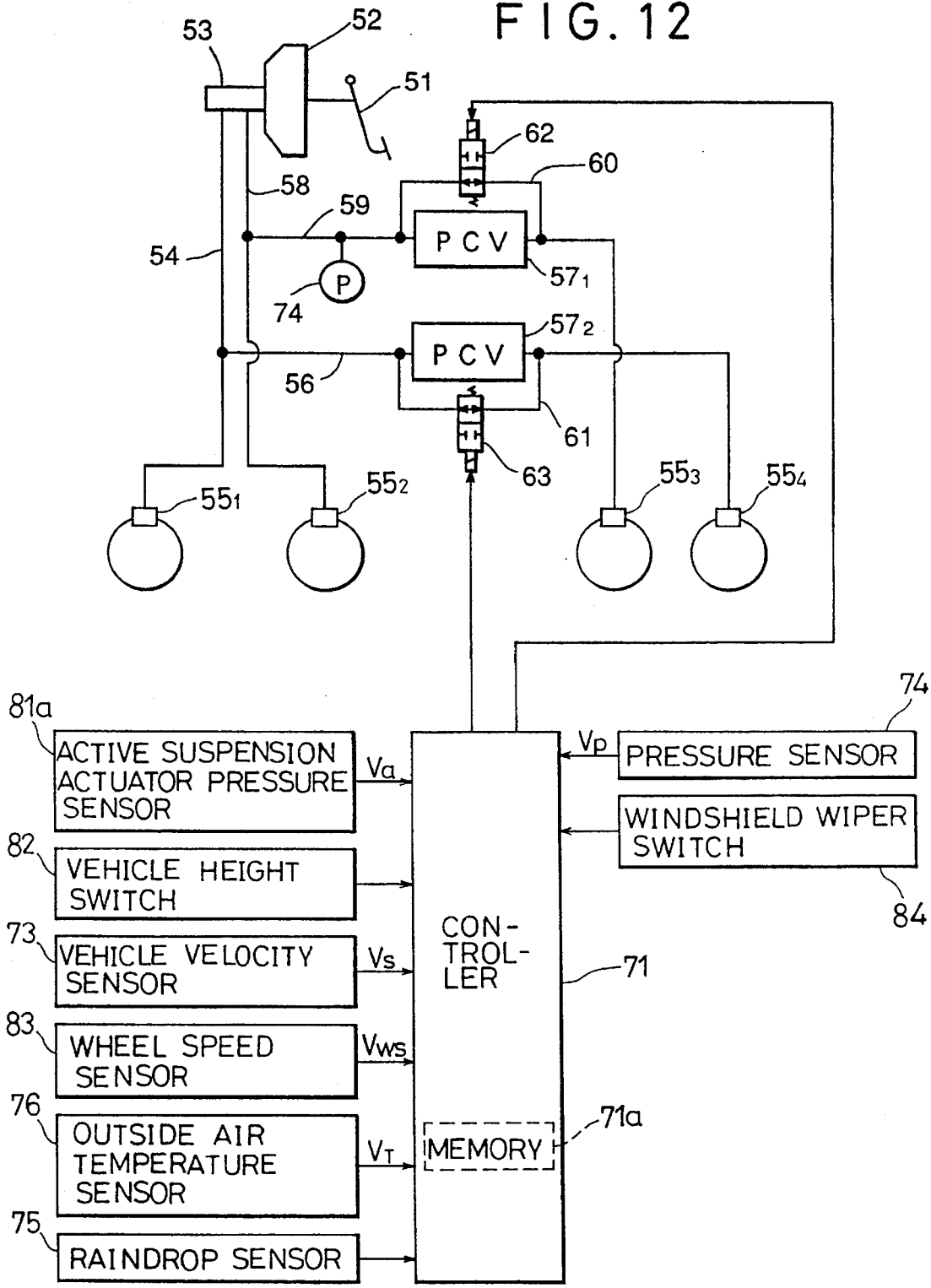
FIG. 12 is a block diagram showing a rear-wheel braking force control apparatus according to a third embodiment of the present invention.
Figure 13:
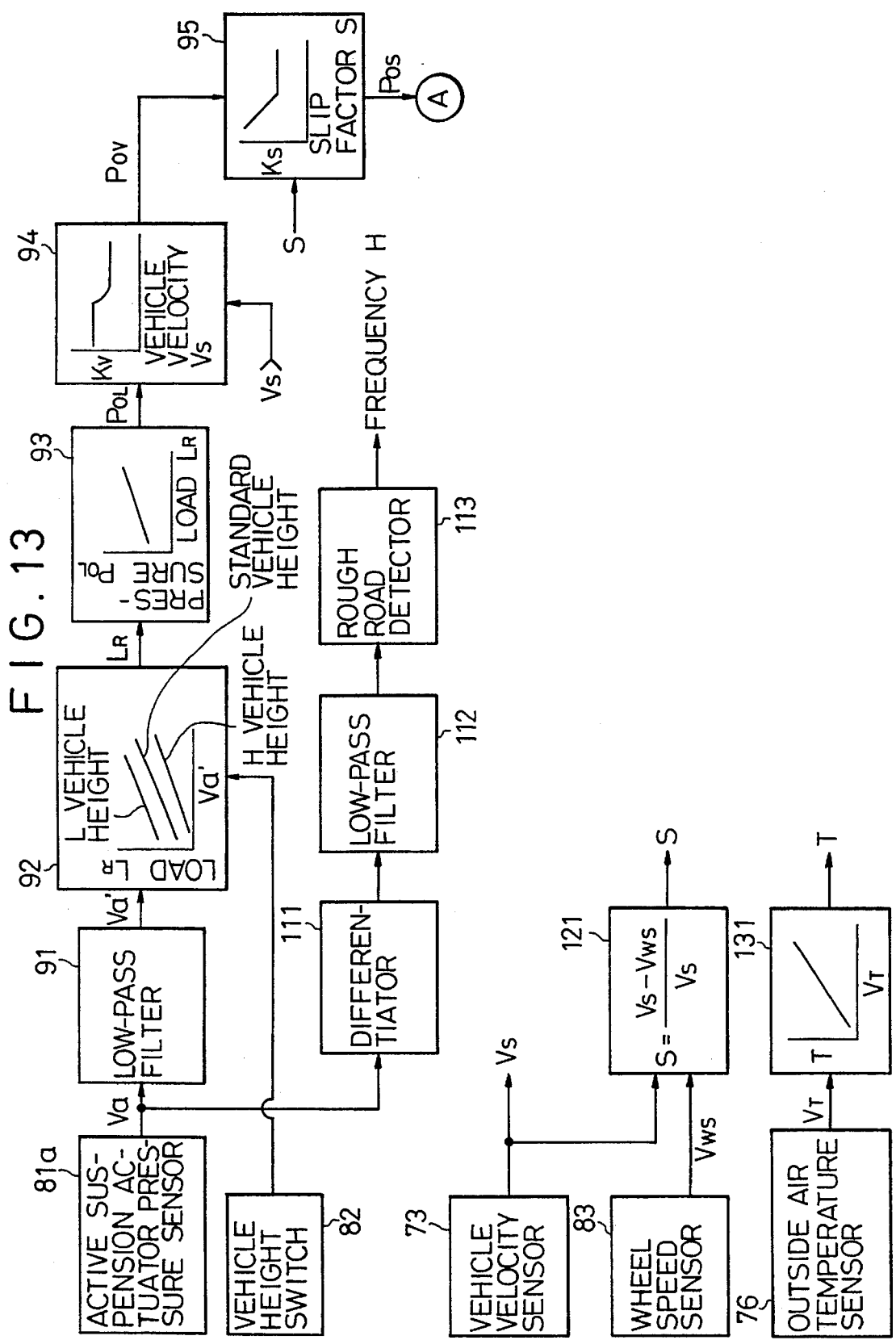
FIG. 13 is a block diagram showing a part of control contents of the apparatus of FIG. 12.
Figure 14:
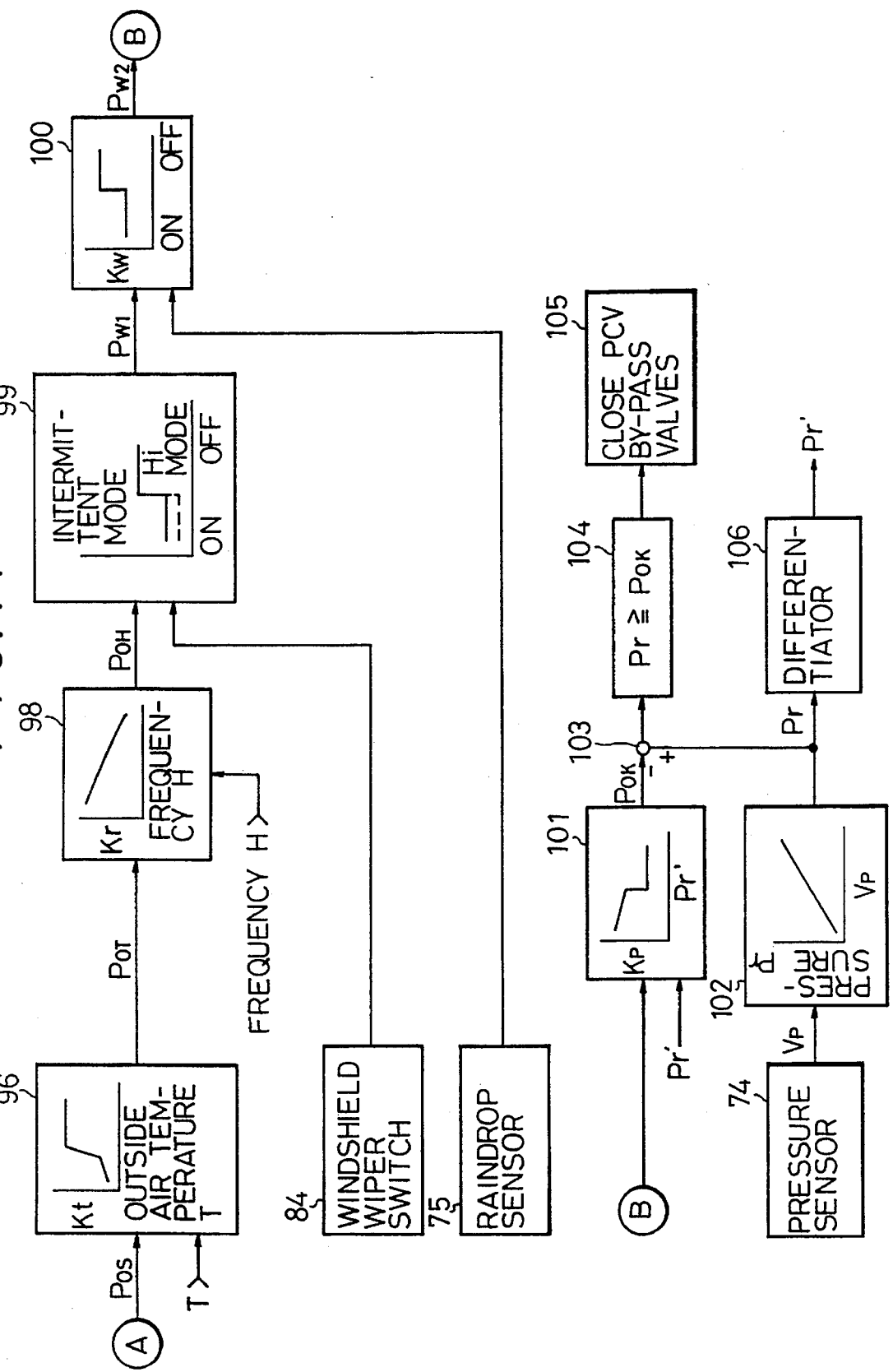
FIG. 14 is a block diagram showing the remaining part of the control contents partially shown in FIG. 13.

Referring now to FIGS. 12 to 14, a rear wheel braking force control apparatus according to a third embodiment of the present invention will be described.

The basic configuration of the apparatus of the present embodiment is identical with that of the second embodiment. In FIG. 13, like numerals are used to designate common elements corresponding to the elements shown in FIG. 9, and a detailed description of those common elements is omitted. The present embodiment differs from the second embodiment mainly in that the apparatus is mounted in a vehicle furnished with an active suspension, and that a rainfall is detected on the basis of the operating state of a windshield wiper.

In FIG. 13, reference numeral 81a denotes an active suspension actuator pressure sensor for detecting a pressure Va of a rear wheel actuator of an active suspension. The active suspension is a suspension in which a fluid is fed into and discharged from fluid spring chambers, which are provided individually for suspension units of the vehicle, so that the load bearing capacity of each suspension unit can be varied to effect absorption of vibration, attitude control such as roll control for turning, vehicle height adjustment, etc. The pressure sensor 81a detects the pressure in each fluid spring chamber, and supplies the detected pressure Va to the controller 71. Reference numeral 82 denotes a vehicle height switch for assigning the vehicle height level of the vehicle which carries the active suspension. An L vehicle height lower than a standard vehicle height and an H vehicle height higher than the standard vehicle height, as well as the standard vehicle height, can be selected by manually operating the switch 82.

Referring now to FIGS. 13 and 14, the contents of control by means of the controller 71 will be described.

In FIGS. 13 and 14, the pressure Va detected by means of the pressure sensor 81 is applied to the low-pass filter 91, and a pressure Va' from the filter 91, whose high-frequency pressure fluctuation is cut, along with a control signal from the vehicle height switch 82, is applied to the rear wheel load estimator section 92. The estimator section 92 estimates the rear wheel load $L_R$ which corresponds to the pressure Va', depending on the vehicle height, H, standard, or L, assigned by the control signal from the vehicle height switch 82. A map illustrated in the block 92 of FIG. 13 and various other maps mentioned later are stored in the memory means 71a of the controller 71. The pressure-load (Va'–$L_R$) map is arranged so that the load $L_R$ for the L vehicle height is greater than the load $L_R$ for the standard vehicle height or H vehicle height at the same pressure Va'. This is attributable to the fact that if the H vehicle height is selected, for example, the pressure of the pressure sensor 81a increases to supply the fluid to the fluid spring chambers, in order to increase the vehicle height. Thus, even though the load $L_R$ is fixed, the output of the pressure sensor 81a is higher if the H vehicle height is selected.

The rear wheel load $L_R$ obtained by means of the rear wheel load estimator section 92 is delivered to the closing pressure setter section 93 for obtaining a closing pressure $P_{OL}$ which is used to close the PCV by-pass valves 62 and 63. As in the case of the second embodiment, the closing pressure $P_{OL}$ is set so that the greater the load, the higher it is. As in the case of the second embodiment, the closing pressure $P_{OL}$ thus obtained is compensated with use of the coefficient Kv, which varies depending on the vehicle velocity Vs, in the vehicle velocity compensator section 94, and is then compensated with use of the coefficient $K_S$, which varies depending on the slip factor S, in the slip factor compensator section 95. As in the case of the second embodiment, the vehicle-velocity-compensated and slip-factor-compensated closing pressure $P_{OS}$ is further compensated with use of the coefficient Kt, which varies depending on the outside air temperature T, in the outside air temperature compensator section 96, and is then compensated with use of the coefficient Kr, which varies depending on the level frequency H indicative of the road roughness, in the rough road compensator section 98.

The compensated closing pressure $P_{OH}$ from the rough road compensator section 98 is delivered to a first wet road compensator section 99, and is multiplied by a coefficient $K_{W1}$. The compensator section 99 is supplied with a control signal (on/off) from a windshield wiper switch 84. As seen from the map of the block 99, the coefficient $K_{W1}$ is set so as to be changed to a smaller value when the windshield wiper switch 84 is turned on. Also, the coefficient $K_{W1}$ is set so as to take a smaller value when the windshield wiper is operated in a "Hi mode," as indicated by broken line, than when the wiper is operated intermittently. This is because the rear wheels are liable to be locked on a rain-wet road such that the windshield wiper switch 84 is turned on, and that the "Hi mode," compared with the intermittent mode, is used when the road surface is more slippery due to a heavier rain.

A compensated closing pressure $P_{W1}$ from the first wet road compensator section 99 is delivered to a second wet road compensator section 100, which corresponds to the wet road compensator section 100 of the second embodiment, and is multiplied by a coefficient $K_{W2}$. The second wet road compensator section 100 is supplied with the output signal from the raindrop sensor 75. As seen from the map of the block 100, the coefficient $K_{W2}$, like the coefficient $K_W$ of the second embodiment, is set so as to be changed to a smaller value when the raindrop sensor output is turned on.

A closing pressure $P_{W2}$ outputted from the second wet road compensator section 100 is delivered to a hard braking compensator section 101 shown in FIG. 14, and is multiplied by a coefficient $K_P$ to calculate the closing pressure $P_{OK}$. The hard braking compensator section 101 is supplied with a time-dependent changing rate Pr' of the braking pressure, which is indicative of hard braking. As seen from the map of the block 101, the coefficient $K_P$ is set so as to become smaller as the time-dependent changing rate Pr' of the braking pressure increases, and to be fixed to a low value when the time-dependent changing rate Pr' exceeds a certain level, whereby the closing pressure is compensated for reduction when the vehicle is braked hard.

The electrical signal Vp, which corresponds to the brake fluid pressure detected by means of the pressure sensor 74, is delivered to the converter section 102, whereupon it is converted into the brake fluid pressure Pr. In the subtracter section 103, the closing pressure $P_{OK}$ is subtracted from the brake fluid pressure Pr. The value indicative of the result of this subtraction is delivered to the discriminator section 104, whereupon it is determined whether or not there is the relation $Pr \geq P_{OK}$. If the decision result is positive, the processor section 105 is activated to close the PCV by-pass valves 62 and 63.

The brake fluid pressure Pr from the converter section 102 is delivered to a differentiator section 106, whereupon the time-dependent changing rate Pr' is obtained and delivered to the aforesaid hard braking compensator section 101.

Like the stroke sensor signal $V_{ST}$ of the second embodiment, the pressure Va of the actuator of the active suspension, detected by means of the pressure sensor 81a, is delivered to the differentiator section 111 to be differentiated thereby. The output of the differentiator section 111 is delivered to the low-pass filter 112, whereupon its high-frequency component is cut. Further, the output of the low-pass filter 112 is delivered to the rough road detector section 113, whereupon the number of times the predetermined level is exceeded within the predetermined period of time is calculated as the frequency H which corresponds to the level of roughness of the road. The frequency H is delivered to the aforesaid rough road compensator section 98.

As in the case of the second embodiment, the slip factor S $(=(Vs-V_{WS})/Vs)$ is calculated according to the vehicle velocity Vs and the wheel speed $V_{WS}$ in the slip factor calculator section 121, to be delivered to the slip factor compensator section 95. Also, the output voltage $V_T$ from the outside air temperature sensor 76 is converted into the outside air temperature T in the converter section 131, whereupon it is delivered to the outside air temperature compensator section 96.

The following is a description of the operation of the rear wheel braking force control apparatus according to the present embodiment constructed in this manner.

The pressure Va of the actuator of the active suspension, detected by means of the pressure sensor 81a, is applied to the low-pass filter 91, whereupon its high-frequency pressure fluctuation is cut. Then, the pressure Va is applied to the rear wheel load estimator section 92, whereupon the load $L_R$ acting on the rear wheels is estimated in accordance with the vehicle height selected by means of the vehicle height switch 82. The rear wheel load $L_R$ is delivered to the closing pressure setter section 93, whereupon the closing pressure $P_{OL}$ for closing the PCV by-pass valves 62 and 63, which corresponds to the rear wheel load $L_R$, is obtained. Thereafter, the closing pressure $P_{OL}$ is multiplied successively by the coefficients Kv, Ks, Kt, Kr, $K_{W1}$, $K_{W2}$ and Kp in the vehicle velocity compensator section 94, slip factor compensator section 95, outside air temperature compensator section 96, rough road compensator section 98, first and second wet road compensator sections 99 and 100, and hard braking compensator section 111, respectively. By doing this, the final closing pressure $P_{OK}$ is obtained.

If the discriminator section 104 concludes that the brake fluid pressure Pr detected by means of the pressure sensor 74 is equal to or higher than the closing pressure $P_{OK}$, the PCV by-pass valves 62 and 63 are closed, and processing for activating the PCVs $57_1$ and $57_2$ is executed. As in the cases of the first and second embodiments, if the PCV by-pass valves 62 and 63 are closed, for example, at the point e which corresponds to the input fluid pressure P3 $(=P_{OK})$, as shown in FIG. 4, the output fluid pressure is kept at the point e before the input fluid pressure becomes equal to or higher than the pressure at the point f.

Thus, according to the present embodiment, the closing pressure can be also compensated in accordance with the operating state of the windshield wiper switch 84, as well as the slip factor and the raindrop sensor output, whereby the rear wheels can be prevented from locking on a slippery road surface.

Figure 15:
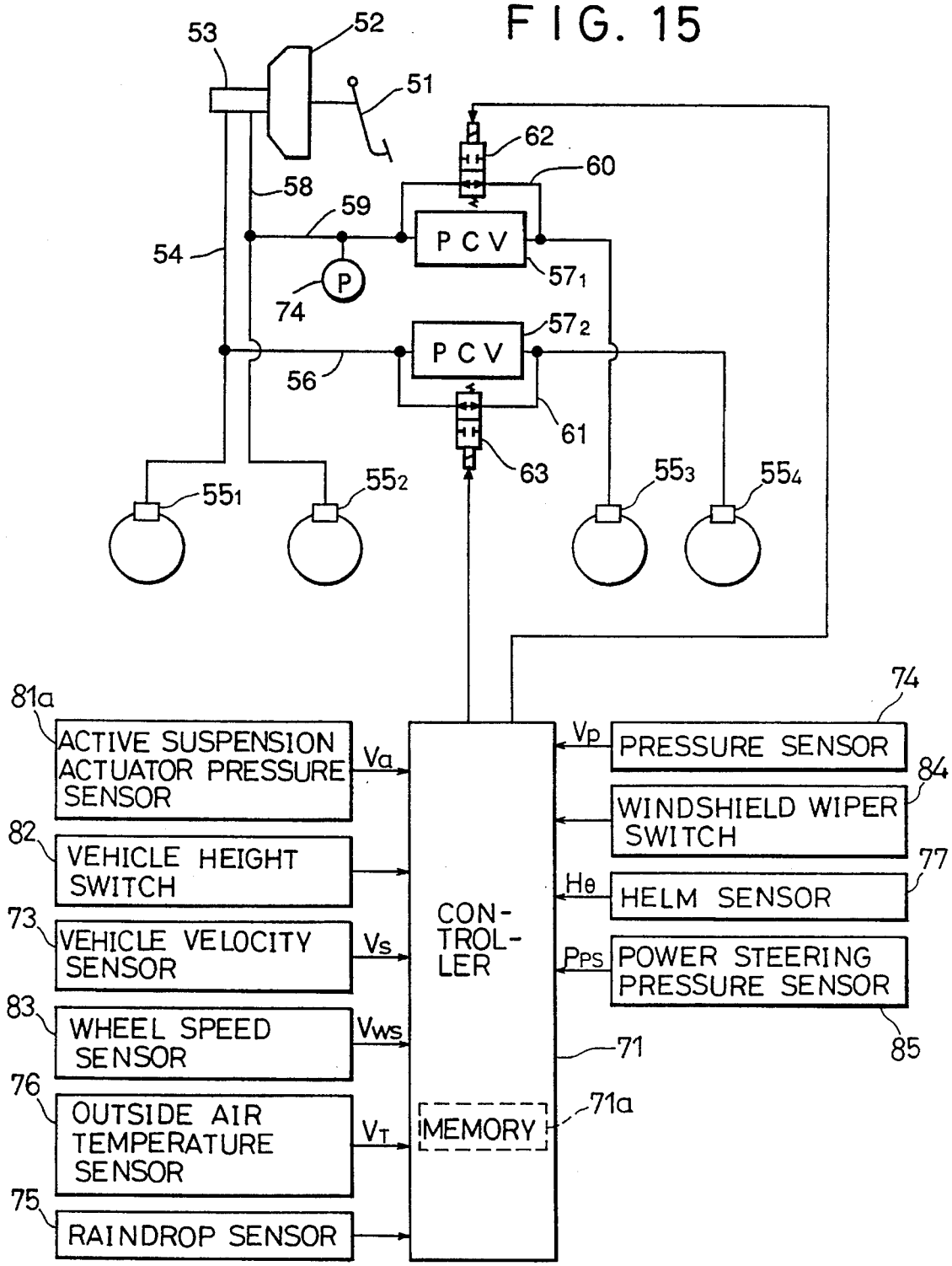
FIG. 15 is a block diagram showing a rear-wheel braking force control apparatus according to a fourth embodiment of the present invention.
Figure 16:
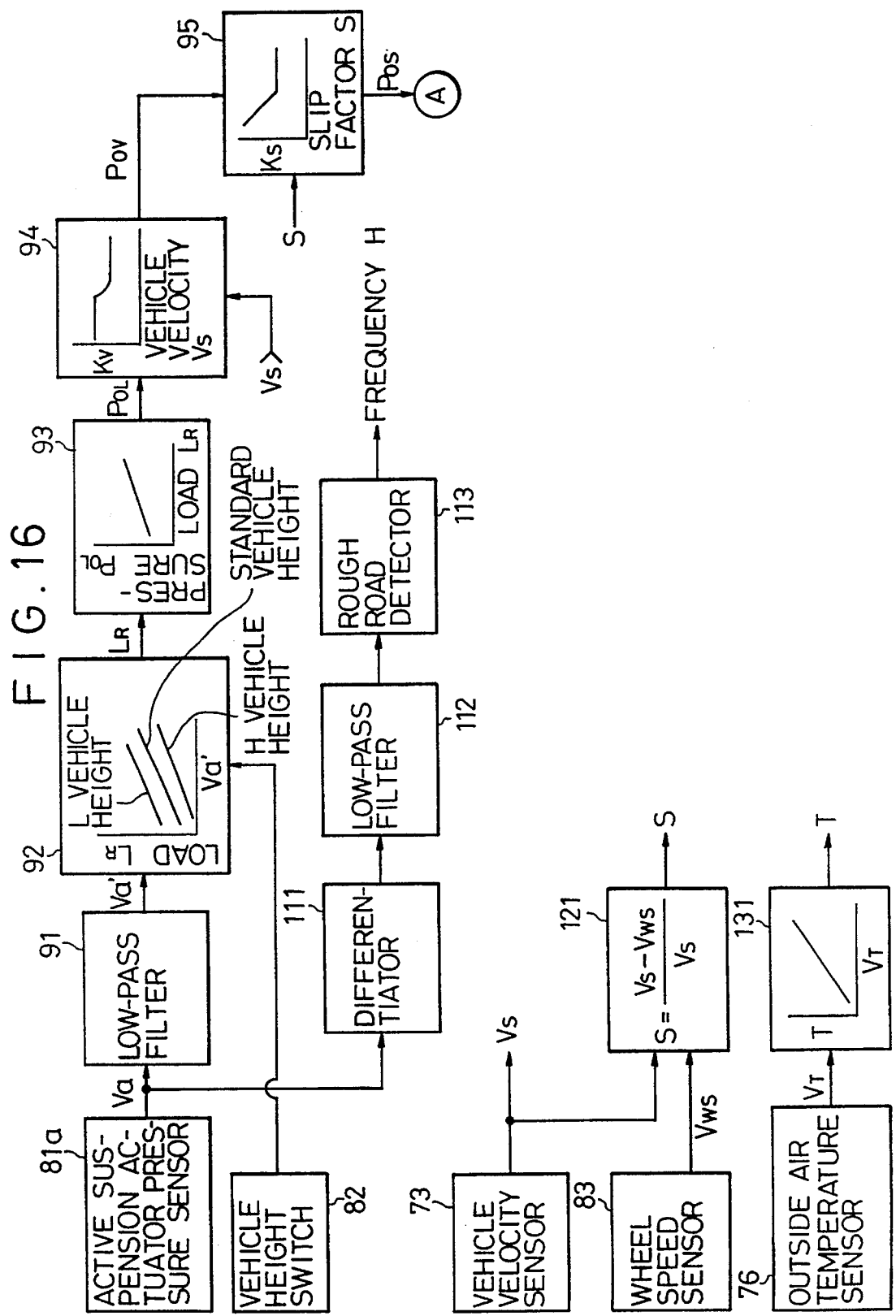
FIG. 16 is a block diagram showing a part of control contents of the control apparatus of FIG. 15.

Referring now to FIGS. 15 and 16, a rear wheel braking force control apparatus according to a fourth embodiment of the present invention will be described. The basic configuration of the apparatus of the present embodiment is identical with that of the third embodiment. In FIG. 15, like numerals are used to designate common elements corresponding to the elements shown in FIG. 12, and a detailed description of those common elements is omitted. The present embodiment differs from the third embodiment mainly in that the closing pressure is compensated in accordance with road surface conditions discriminated on the basis of the power steering output.

In connection with this difference, the apparatus of the present embodiment is furnished with a power steering pressure sensor 85 for detecting a power steering pressure $P_{PS}$, as well as the active suspension actuator pressure sensor 81a, vehicle height switch 82, wheel speed sensor 83, windshield wiper switch 84, etc. which are provided individually for the apparatus of the third embodiment. The power steering pressure $P_{PS}$ detected by means of the sensor 85, along with the wheel speed $V_{WS}$ detected by means of the sensor 83 and the on/off (operating/nonoperating) signal from the switch 84, is supplied to the controller 71.

Figure 17:
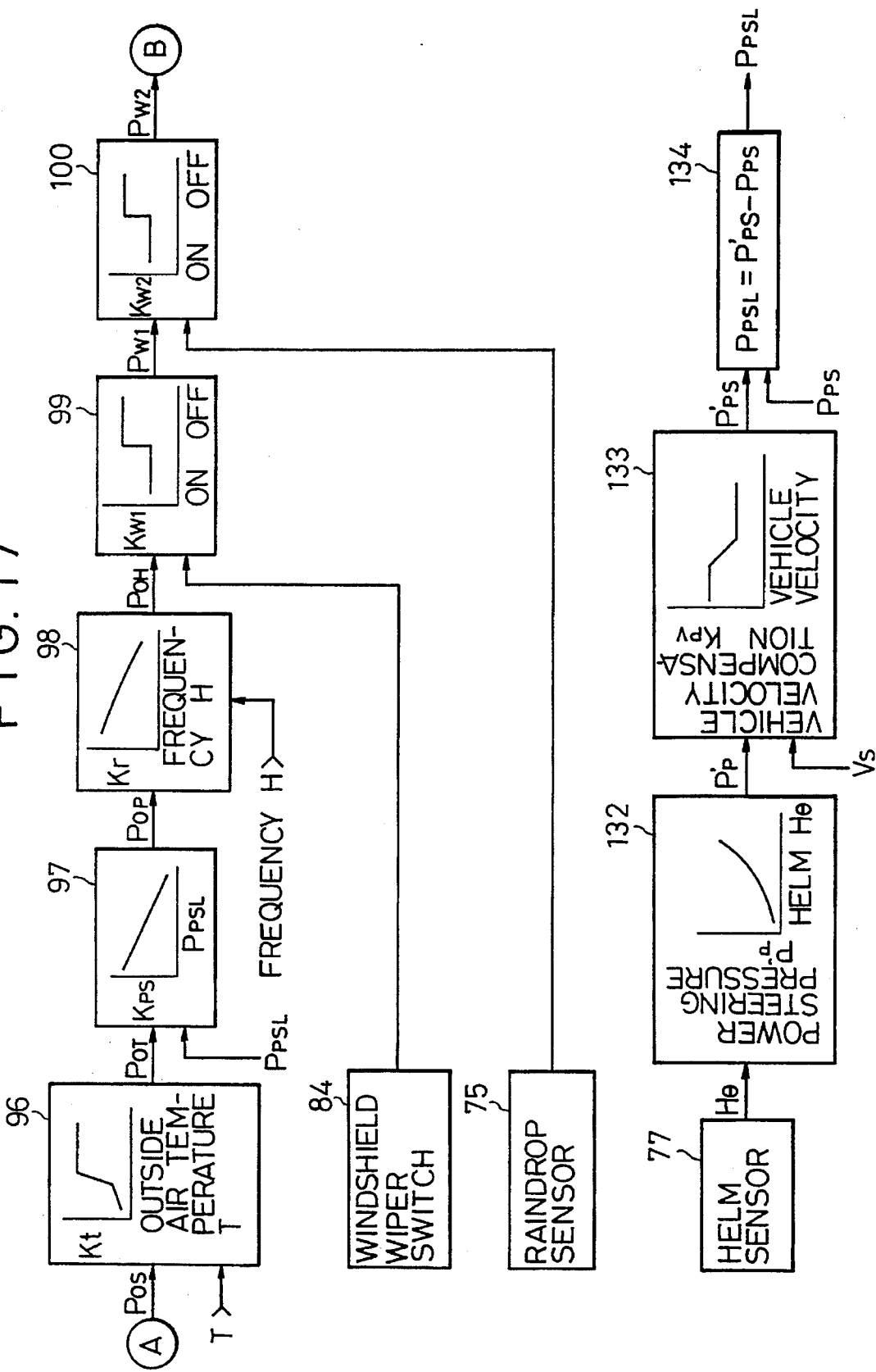
FIG. 17 is a block diagram showing another part of the control contents of the control apparatus.
Figure 18:
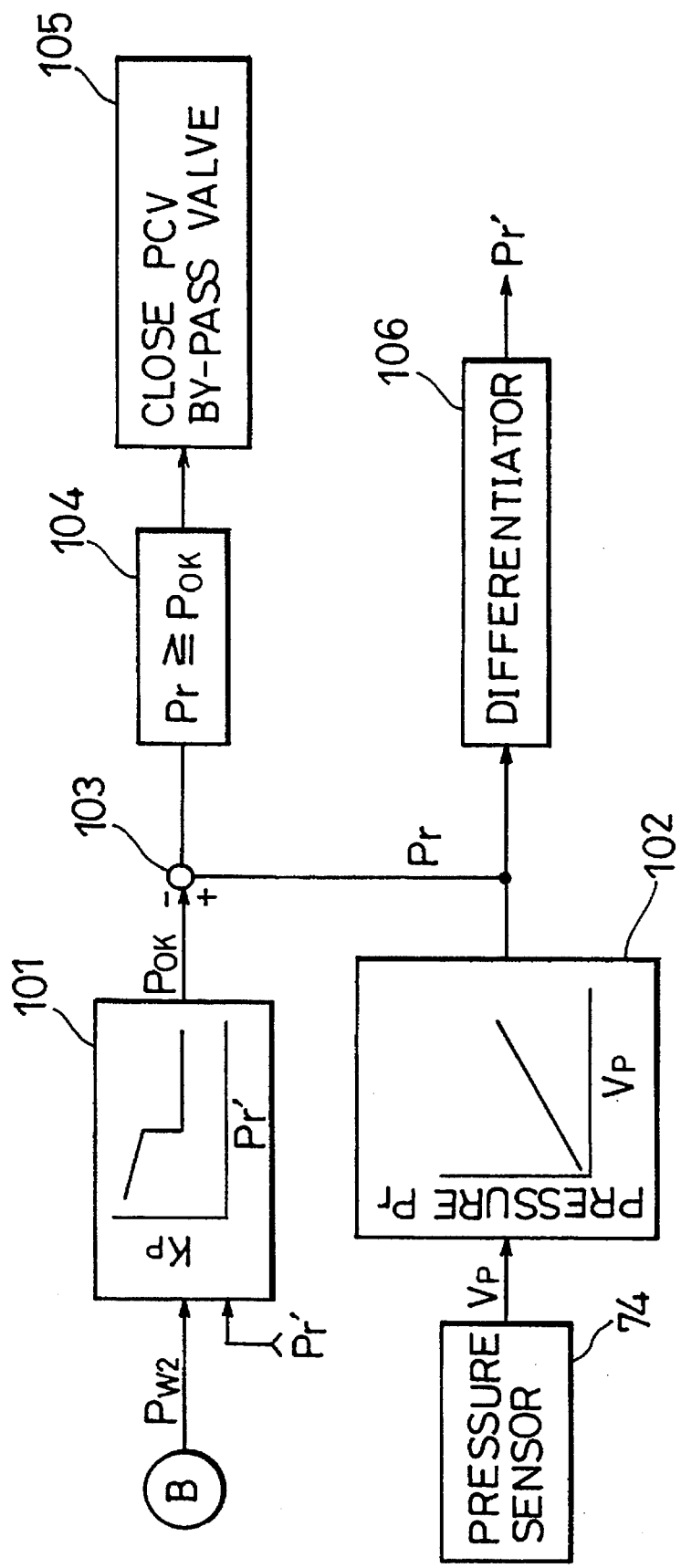
FIG. 18 is a block diagram showing the remaining part of the control contents partially shown in FIGS. 16 and 17.

Referring now to FIGS. 16 to 18, the contents of control by means of the controller 71 will be described.

As in the case of the third embodiment, the rear wheel load $L_R$ is estimated in the rear wheel load estimator section 92 from the low-pass filter output Va', which corresponds to the pressure sensor output Va, and the control signal from the vehicle height switch 82, as shown in FIGS. 16 to 18. Then, the closing pressure $P_{OL}$ for closing the PCV by-pass valves 62 and 63 is set in accordance with the estimated rear wheel load $L_R$ in the closing pressure setter section 93. As in the case of the third embodiment, the closing pressure $P_{OL}$ thus obtained is compensated with use of the coefficient Kv, which varies depending on the vehicle velocity Vs, in the vehicle velocity compensator section 94, then compensated with use of the coefficient $K_S$, which varies depending on the slip factor S, in the slip factor compensator section 95, and further compensated with use of the coefficient Kt, which varies depending on the outside air temperature T, in the outside air temperature compensator section 96.

The compensated closing pressure $P_{OT}$ outputted from the outside air temperature compensator section 96 is delivered to a low-μ road compensator section 97, whereupon it is multiplied by a coefficient $K_{PS}$. The low-μ road compensator section 97 is supplied with a deviation $P_{PSL}$ (mentioned later) between the actual power steering pressure $P_{PS}$ and an estimated power steering pressure $P_{PS}'$. As seen from the map of the block 97, the coefficient $K_{PS}$ is set so that the greater the deviation $P_{PSL}$, the smaller it is. This is because the actual power steering pressure $P_{PS}$ is lower than the estimated power steering pressure $P_{PS}'$ on a low-μ road.

Further, a compensated closing pressure $P_{OP}$ from the low-μ road compensator section 97 is delivered to the rough road compensator section 98, and is multiplied by the coefficient Kr which varies depending on the level frequency H from the rough road detector section, which is indicative of the roughness of the road, and will be mentioned later.

As in the case of the third embodiment, the compensated closing pressure $P_{OH}$ from the rough road compensator section 98 is compensated with use of the coefficient $K_{W1}$, which varies depending on the control signal from the windshield wiper switch 84, in the first wet road compensator section 99, compensated with use of the coefficient $K_{W2}$, which varies depending on the output signal from the raindrop sensor 75, in the second wet road compensator section 100, and further compensated with use of the coefficient $K_P$, which varies depending on the time-dependent changing rate Pr' of the braking pressure, which is indicative of hard braking, in the hard braking compensator section 101. Then, the output signal Vp from the pressure sensor 74 is converted into the brake fluid pressure Pr in the converter section 102, and the closing pressure $P_{OK}$ is subtracted from the brake fluid pressure Pr in the subtracter section 103. If it is concluded in the discriminator section 104 that there is the relation $Pr \geq P_{OK}$, the PCV by-pass valves 62 and 63 are closed by means of the processor section 105.

As in the case of the third embodiment, moreover, the time-dependent changing rate Pr', obtained in the differentiator section 106 on the basis of the brake fluid pressure Pr from the converter section 102, is delivered to the hard braking compensator section 101. Then, the frequency H, calculated in accordance with the pressure sensor output Va supplied to the rough road detector section 113 through the differentiator section 111 and the low-pass filter 112, is delivered to the rough road compensator section 98. Further, the slip factor S (=$(Vs-V_{WS})/Vs$), calculated according to the vehicle velocity Vs and the wheel speed $V_{WS}$ in the slip factor calculator section 121, is delivered to the slip factor compensator section 95. The outside air temperature sensor output $V_T$ is converted into the outside air temperature T in the converter section 131, whereupon it is delivered to the outside air temperature compensator section 96.

As shown in FIG. 17, the helm Hθ of the steering wheel, detected by means of the helm sensor 77, is supplied to a power steering pressure estimator section 132. A map illustrated in the estimator section 132 indicates a power steering pressure $P_P'$ which is required to rotate the steering wheel for the helm Hθ. The power steering pressure $P_P'$ is delivered to a vehicle velocity compensator section 133, whereupon it is multiplied by a coefficient $K_{PV}$ which varies depending on the vehicle velocity Vs detected by means of the vehicle velocity sensor 73. A velocity-responsive power steering system is controlled so that the manual steering effort for the steering wheel becomes heavier as the vehicle velocity increases. Accordingly, the power steering pressure lowers as the vehicle velocity increases. Thus, the coefficient $K_{PV}$ is set so as to become smaller with the increase of the vehicle velocity.

The compensated estimated power steering pressure $P_{PS}'$ from the vehicle velocity compensator section 133 is applied to a deviation calculator section 134, whereupon the actual power steering pressure $P_{PS}$, detected by means of the power steering pressure sensor 85, is subtracted from the estimated power steering pressure $P_{PS}'$, whereby the deviation $P_{PSL}$ is calculated. The deviation $P_{PSL}$, which increases as the friction coefficient μ of the road surface lowers, is applied to the aforesaid low-μ road compensator section 97.

The following is a description of the operation of the rear wheel braking force control apparatus according to the present embodiment constructed in this manner.

The pressure Va of the actuator of the active suspension, detected by means of the pressure sensor 81a, is applied to the low-pass filter 91, whereupon its high-frequency pressure fluctuation is cut. Then, the pressure Va is applied to the rear wheel load estimator section 92, whereupon the load $L_R$ acting on the rear wheels is estimated depending on the vehicle height selected by means of the vehicle height switch 82. The rear wheel load $L_R$ is delivered to the closing pressure setter section 93, whereupon the closing pressure $P_{OL}$ for closing the PCV by-pass valves 62 and 63, which corresponds to the rear wheel load $L_R$, is obtained. Thereafter, the closing pressure $P_{OL}$ is multiplied successively by the coefficients Kv, Ks, Kt, $K_{PS}$, Kr, $K_{W1}$, $K_{W2}$ and Kp in the vehicle velocity compensator section 94, slip factor compensator section 95, outside air temperature compensator section 96, low-μ road compensator section 97, rough road compensator section 98, first and second wet road compensator sections 99 and 100, and hard braking compensator section 101, respectively, whereupon the final closing pressure $P_{OK}$ is obtained. If it is detected in the discriminator section 104 that the brake fluid pressure Pr detected by means of the pressure sensor 74 is equal to or higher than the closing pressure $P_{OK}$, the PCV by-pass valves 62 and 63 are closed, and processing for activating the PCVs $57_1$ and $57_2$ is executed.

Thus, according to the present embodiment, the closing pressure $P_{OK}$ for closing the PCV by-pass valves 62 and 63 is subjected to reductive compensation when a low-μ road is discriminated by a low actual power steering output, as well as the compensation according to the third embodiment, based on the slip factor, outside air temperature, raindrop sensor output, and windshield wiper switch output. Accordingly, the rear wheels can be more securely prevented from locking on a slippery road surface, if any, and the rear wheel braking force can be increased to a level not lower than the ideal braking force distribution, within a range such that the rear wheels cannot be locked in an early stage.

Referring now to FIGS. 19 to 23, a rear wheel braking force control apparatus according to a fifth embodiment of the present invention will be described.

The rear wheel braking force control apparatus according to the present embodiment differs from the apparatuses of the foregoing embodiments mainly in that the apparatus is used with an anti-skid braking system (ABS), and that the closing pressure, which decides the valve closing timing for the by-pass valves, is set according to fuzzy inference based on the outside air temperature and windshield wiper operation period.

Figure 19:
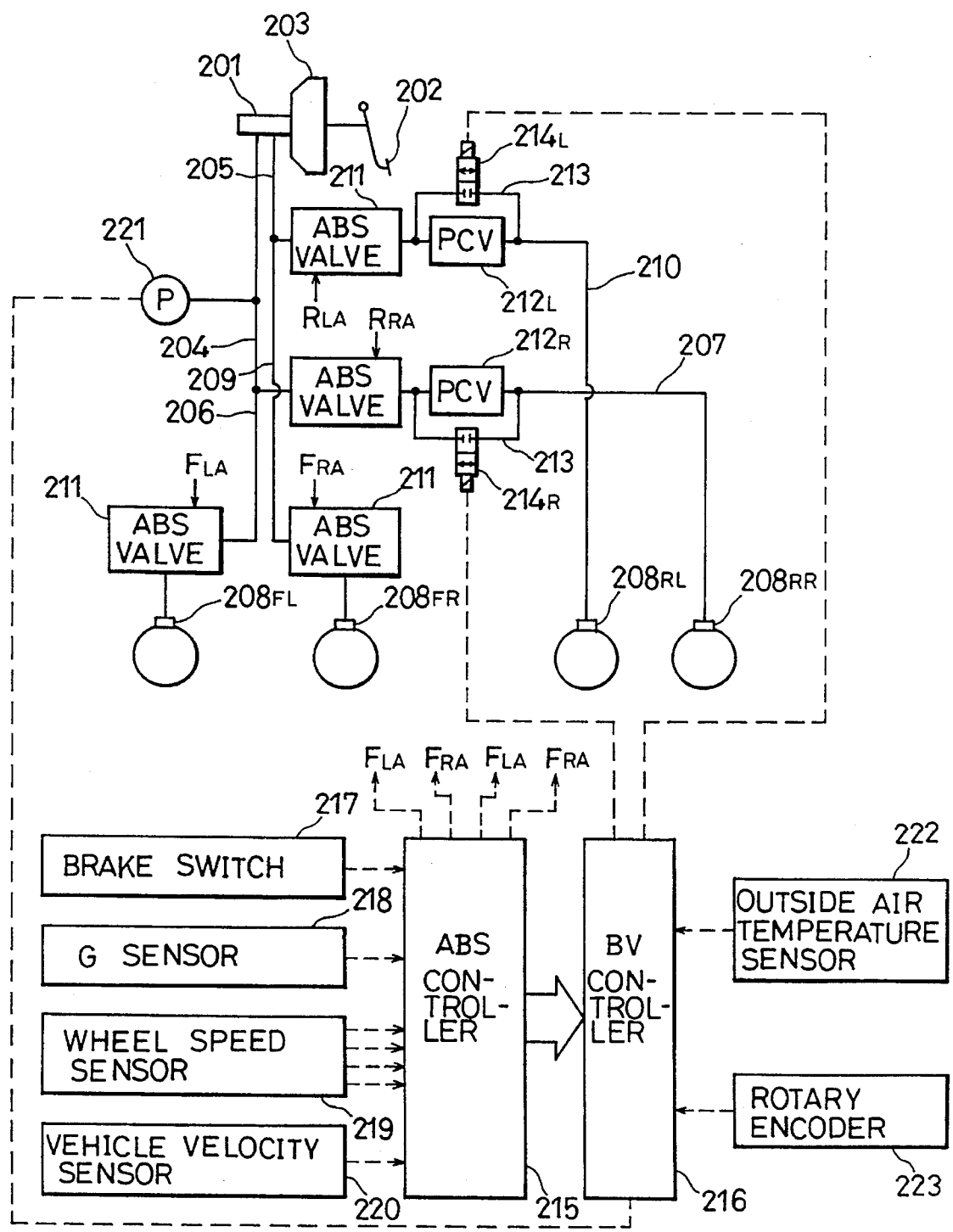
FIG. 19 is a block diagram showing a rear-wheel braking force control apparatus according to a fifth embodiment of the present invention.

As shown in FIG. 19, the vehicle braking system comprises a master cylinder 201 of a tandem. The master cylinder 201 operates in response to the depression of a brake pedal 202 through the medium of a vacuum-type brake booster 203. A pair of main brake lines 204 and 205 extend from each of pressure chambers of the master cylinder 201. The one main brake line 204 diverges into front and rear wheel brake lines 206 and 207. The front wheel brake line 206 is connected to a wheel cylinder 208FL for the front left wheel, while the rear wheel brake line 207 is connected to a wheel cylinder 208RR for the rear right wheel. Likewise, the other main brake line 205 diverges into front and rear wheel brake lines 209 and 210, which are connected to wheel cylinders 208FR and 208RL for the front right and rear left wheels, respectively.

An anti-skid valve (ABS valve) 211 is disposed in the middle of each wheel brake line. These ABS valves 211 control the braking pressures of the wheel cylinders 208, which correspond to the ABS valves, in response to command signals from an ABS controller, which will be mentioned later. A pump system for supplying the brake fluid to the wheel cylinders 208 through the ABS valves 211, return lines for releasing the brake fluid from the wheel cylinders through the ABS valves 211. etc. are not shown in FIG. 19.

Figure 20:
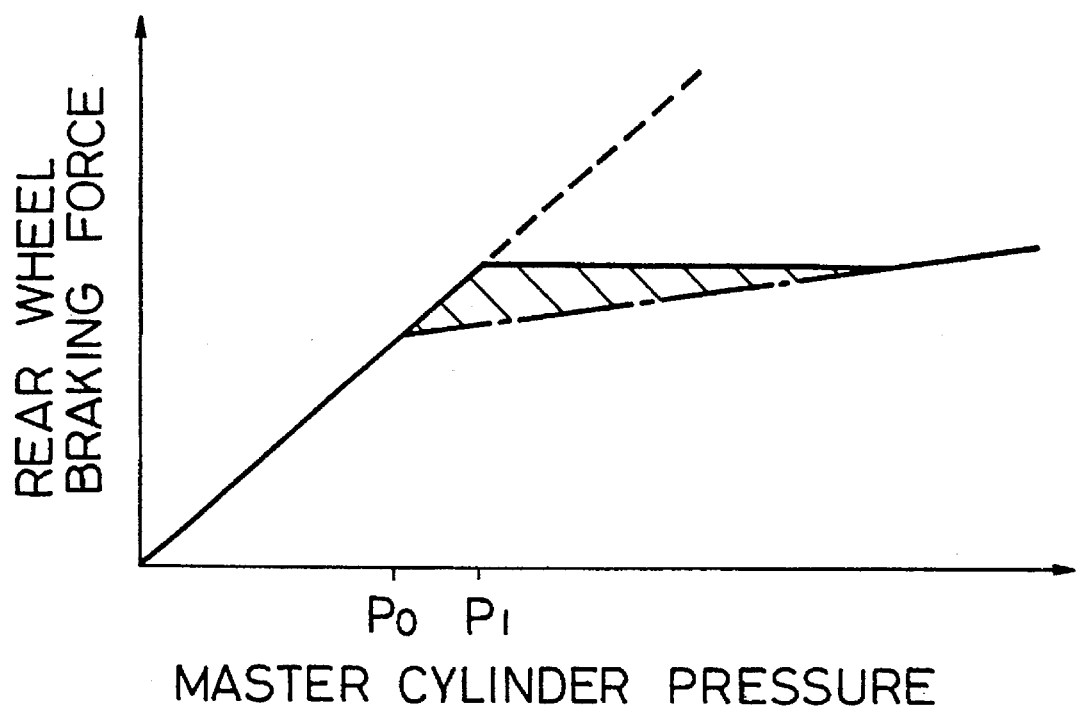
FIG. 20 is a diagram for illustrating the operation of a proportioning valve in the control apparatus of FIG. 19.

On the lower-course side of the ABS valves 211, proportioning valves (PCVs) 212L and 212R for use as control valves are arranged in the middle of the rear wheel brake lines 207 and 210, respectively. These PCVs 212 serve to lower the rate of increase of the pressure (rear wheel braking pressure) transmitted to the rear wheel cylinders 208R, compared with that on the front wheel side, when a set pressure $P_o$ is attained by the master cylinder pressure supplied from the master cylinder 201, as shown in FIG. 20. The PCVs 212, whose construction is not illustrated, have their set pressure $P_o$ unconditionally determined by the set load of valve springs, as in the cases of the foregoing embodiments.

Further, the rear wheel brake lines 207 and 210 are provided with by-pass lines 213 for by-passing the PCVs 212, individually. By-pass valves 214L and 214R, formed of normally-close solenoid-operated switching valves, are arranged in the middle of the by-pass lines 213, individually.

Each ABS valve 211 is connected electrically to an ABS controller 215 for anti-skid brake control, while each by-pass valve 214 is connected electrically to a BV controller 216. Both these controllers 215 and 216, which are formed of a microcomputer and its peripheral circuits each, are connected, as required, to each other by means of a communication circuit so that data, control signals, etc. can be transferred between them.

The ABS controller 215 is connected with switches and brakes, such as a brake switch 217 for detecting the depression of the brake pedal 2, a G sensor 218 for detecting the vehicle body deceleration, wheel speed sensors 219 for detecting the respective speeds of the individual wheels, and a vehicle velocity sensor 220 for detecting the vehicle velocity. The wheel speed sensors 219, which are shown as one block in FIG. 19, are provided individually for the wheels.

The ABS controller 215, like the controller 71 shown in FIG. 15, for example, computes the difference between a reference vehicle body speed and each wheel speed, that is, the slip factor for each wheel, in accordance with sensor signals from each wheel speed sensor 219 and the vehicle velocity sensor 220, and delivers ABS control signals $F_{LA}$, $F_{RA}$, $R_{LA}$ and $R_{RA}$ corresponding to the thus computed slip factors to their corresponding ABS valves 211. Depending on their signal levels, the ABS control signals function as pressure boosting signals for loading the brake fluid into the wheel cylinders 208, holding signals for holding the brake fluid in the wheel cylinders, or pressure reducing signals for unloading the brake fluid from the wheel cylinders. In accordance with the ABS control signals, the ABS valves 212 are switched in a conventional manner. The ABS controller 215 of the present embodiment delivers a holding signal to one of the ABS valve 211 when a satisfactory value for the ABS starting conditions is exceeded by the slip factor of each corresponding wheel. If the slip factor further increases so that the tendency of the wheels to be locked grows, thereafter, the controller 215 delivers a pressure reducing signal.

The BV controller 216, like the controller 71 shown in FIG. 15, for example, fetches an on/off signal from the brake switch 217 with every predetermined sampling period, and compares the master cylinder pressure with a target switching pressure (closing pressure), which Will be mentioned later, thereby controlling the operation of the by-pass valves 214L and 214R. Thus, the by-pass valves 214L and 214R are opened immediately when the brake switch 217 is turned on. When the master cylinder pressure attains the target switching pressure (mentioned later) or when the brake switch 217 is turned off, the by-pass valves 214 are closed. For this by-pass valve control, as shown in FIG. 19, the BV controller 216 is connected electrically with a pressure sensor 221 for detecting the pressure inside the main brake line 204, which is indicative of the master cylinder pressure.

As will be described in detail later, moreover, the BV controller 216 variably controls the target switching pressure depending on the road surface conditions, according to the fuzzy inference based on the outside air temperature and windshield wiper operation period. For this fuzzy inference, the BV controller 216 is connected electrically to an outside air temperature sensor 222 and a rotary encoder 223 for detecting the rotating speed of a windshield wiper motor (not shown). The controller 216 receives the outside air temperature T from the outside air temperature sensor 222, and detects the windshield wiper operation period W in accordance with the wiper motor rotating speed detected by means of the rotary encoder 223.

Figure 21:
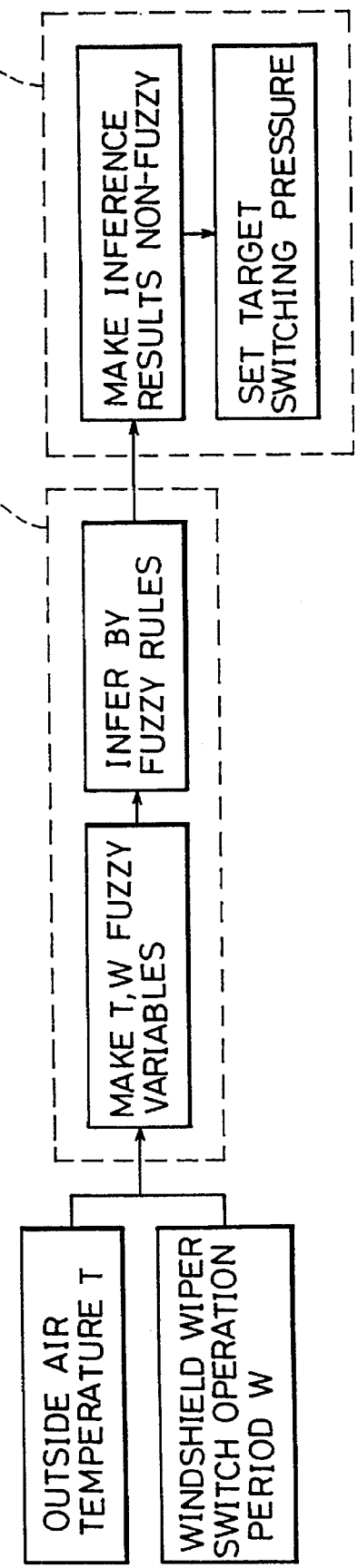
FIG. 21 is a block diagram showing an example of fuzzy inference executed by the same control apparatus.

Functionally, as shown in FIG. 21, the BV controller 216 is provided with a controlled variable computing block 224 and a controlled variable command value calculating block 225. In the computing block 224, the outside air temperature T and the windshield wiper operation period W as inputs are fuzzified or made to be fuzzy variables, and inference based on the fuzzy rules mentioned later is carried out. In the calculating block 225, the result of the fuzzy inference is defuzzified or made to be non-fuzzy, whereupon the target switching pressure is finally set. A control routine corresponding to FIG. 21 is always executed in predetermined cycles by means of the BV controller 216 without regard to braking operation of the vehicle, while the vehicle is running.

Figures 22, 23:
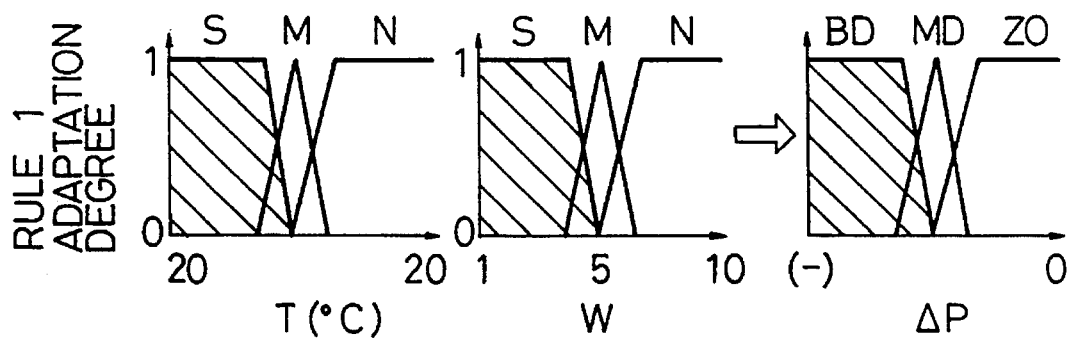
FIG. 22 is a map illustrating fuzzy rules used in the fuzzy inference shown in FIG. 21.
FIG. 23 is a diagram illustrating membership functions of the fuzzy rules illustrated in FIG. 22.

For the fuzzy inference, the BV controller 216 is loaded with, for example, nine fuzzy rules (FIG. 22) which are described in IF-THEN form. Each fuzzy rule includes the outside air temperature T and windshield wiper operation period W as two items (fuzzy variables) of its antecedent, and a compensation value (controlled variable command value) $\Delta P$ as one item of its consequent. This compensation value $\Delta P$ is used to compensate the target switching pressure for reduction, as mentioned later. In FIG. 22, each of symbols S, M, N, BD, MD and ZO represents a label which is indicative of a fuzzy subset (hereinafter referred to simply as fuzzy set) in the whole space or universe of discourse (carrier set) for its corresponding one of the outside air temperature T, windshield wiper operation period W, and compensation value ΔP. Each fuzzy set is represented by a membership function mentioned later.

In FIG. 22, Rule 1, "If T=S and W=S, then ΔP=BD," indicates that if the outside air temperature T and the windshield wiper operation period W are low and short, respectively, each corresponding to a fuzzy set S, then the negative compensation value ΔP is made large. Rules 2 to 9 will now be described in brief.

Rule 2: If the outside air temperature T and the windshield wiper operation period W are low and moderate, respectively, then the compensation value ΔP is made large.

Rule 3: If the outside air temperature T and the windshield wiper operation period W are low and long, respectively, then the compensation value ΔP is made moderate.

Rule 4: If the outside air temperature T and the windshield wiper operation period W are moderate and short, respectively, then the compensation value ΔP is made moderate.

Rule 5: If the outside air temperature T and the windshield wiper operation period W are both moderate, then the compensation value ΔP is made moderate.

Rule 6: If the outside air temperature T and the windshield wiper operation period W are moderate and long, respectively, then the compensation value ΔP is made small.

Rule 7: If the outside air temperature T and the windshield wiper operation period W are high and short, respectively, then the compensation value ΔP is made moderate.

Rule 8: If the outside air temperature T and the windshield wiper operation period W are high and moderate, respectively, then the compensation value ΔP is made small.

Rule 9: if the outside air temperature T and the windshield wiper operation period W are high and long, respectively, then the compensation value ΔP is made small.

Membership functions for individually defining the three fuzzy sets S, M and N for the outside air temperature T, membership functions for individually defining the three fuzzy sets S, M and N for the windshield wiper operation period W, and membership functions for individually defining the three fuzzy sets BD, MD and ZO for the compensation value ΔP are predetermined as shown in FIG. 23, and are stored in the memory means of the BV controller 216.

Referring to FIG. 23, the membership function associated with the fuzzy set S for the outside air temperature T is set so that its adaptation or conformity degree is 1 when the outside air temperature T is not higher than a first predetermined temperature, which is lower than 0° C., and that the adaptation degree is reduced from 1 to 0 as the outside air temperature T increases from the first predetermined temperature to 0° C. Further, the membership function associated with the fuzzy set M for the outside air temperature T is set so that its adaptation degree varies within the range from 0 to 1 as the outside air temperature T changes from the first predetermined temperature to a second predetermined temperature which is higher than 0° C. Also, the membership function associated with the fuzzy set N for the outside air temperature T is set so that its adaptation degree varies within the range from 0 to 1 when the outside air temperature T is not lower than 0° C.

The membership functions associated with the fuzzy sets S, M and N for the windshield wiper operation period W and the fuzzy sets BD, MD and ZO for the compensation value ΔP are set substantially in the same manner as the fuzzy sets S, M and N for the outside air temperature T, as shown in FIG. 23. For example, the membership function associated with the fuzzy set S for the windshield wiper operation period W is set so that its adaptation degree is 1 when the period W is not longer than a first predetermined period, which is shorter than 5 cycles per minute, and that the adaptation degree varies within the range from 0 to 1 as the temperature T changes within the range from the first predetermined period to 5 cycles per minute. Further, the membership function associated with each fuzzy set for the compensation value ΔP is set so that its adaptation degree varies within the range from 0 to 1 as the compensation value ΔP changes within a negative region.

In setting the target switching pressure, the BV controller 216 makes a fuzzy inference in conventional steps of procedure on the basis of detected conditions, represented by the outside air temperature sensor output T and the windshield wiper operation period W calculated from the rotary encoder output, and the nine fuzzy rules shown in FIG. 22. In this fuzzy inference, a membership value for the detected outside air temperature associated with its corresponding one of the membership functions for the outside air temperature T (one item of antecedent) and a similar membership value for the windshield wiper operation period W (another item of antecedent) are obtained with respect to each of the fuzzy rules. Then, in order to obtain an inference output on the basis of the max-min principle, the corresponding membership function for the compensation value ΔP (item of consequent) is top-cut with a smaller value (adaptation degree), out of the two membership values, and a figure corresponding to the cut membership function is obtained. In order to make the inference output non-fuzzy, moreover, the center of gravity of a figure obtained by combining the figures corresponding individually to the nine rules is calculated as the compensation value (controlled variable command value) ΔP.

When the compensation value ΔP is calculated in this manner, the controller 216 calculates the target switching pressure PX according to the following equation.

$$PX=PX-\Delta P.$$

Here the initial value of the target switching pressure PX is set at a value higher than a set pressure P0 for the PCVs 212, as shown in FIG. 21.

By the fuzzy inference described above, the target switching pressure PX of the by-pass valves 214 can be properly set in accordance with the friction coefficient μ of the road surface. If the road conditions are such that the outside air temperature T and the windshield wiper operation period W are low and short, respectively, thus conforming to Rule 1, then it is supposed that the friction coefficient of the road surface is very low due to the highly possible freezing of the road surface or fallen snow thereon. In this case, the target switching pressure PX is sharply reduced so that the by-pass valves 214 are closed in an early stage of braking operation, thereby restraining the distribution of the rear wheel braking force. If the road conditions are such that the outside air temperature T and the windshield wiper operation period W are nearly 0° C. and short or moderate, respectively, thus conforming to Rule 4 or 5, then it is supposed that the road surface is slippery, that is, its friction coefficient is low, due to a rainfall, and the target switching pressure PX is reduced to a moderate level. By doing this, the distribution of the rear wheel braking force can be restrained in response to the lowering of the friction coefficient of the road surface. If the road conditions are such that the outside air temperature T and the windshield wiper operation period W are high and moderate or long, respectively, thus conforming to Rule 8 or 9, on the other hand, then it is supposed that the road surface is dry, that is, its friction coefficient is high, and the target switching pressure PX is slightly reduced or is not reduced. In this case, the rear wheel braking force distribution is enhanced.

The above-described fuzzy control of the target switching pressure PX is executed without regard to the braking operation of the vehicle, so that the target switching pressure PX set in accordance with the running conditions before the start of the braking operation. Thus, the rear wheel braking force can be securely prevented from becoming excessively large, and besides, the operation frequency of the ABS system on the rear wheel side can be lowered.

According to the present embodiment, if it is supposed, in accordance with the fuzzy inference based on the outside air temperature and the windshield wiper operation period, that the friction coefficient of the road surface is low, the target switching pressure (target value of master cylinder pressure), which determines the valve closing timing of the by-pass valves, is lowered, so that the rear wheel braking force distribution cannot become excessive during the braking operation. Since the target switching pressure is variably controlled without regard to the braking operation of the vehicle, moreover, the target switching pressure can be properly set in accordance with the friction coefficient of the road surface estimated before the start of the braking operation. Thus, a marked effect can be produced such that the operation frequency of the ABS on the rear wheel side cannot increase, also in the case where the variable control of the target switching pressure and the ABS control are combined together.

According to the fuzzy inference of the present embodiment, the controlled variable command value ΔP is calculated by the max-min principle or gravity center method. Alternatively, however, any other method of calculation may be used, or any other membership functions than the membership functions shown in FIG. 23 may be used.

Figure 24:
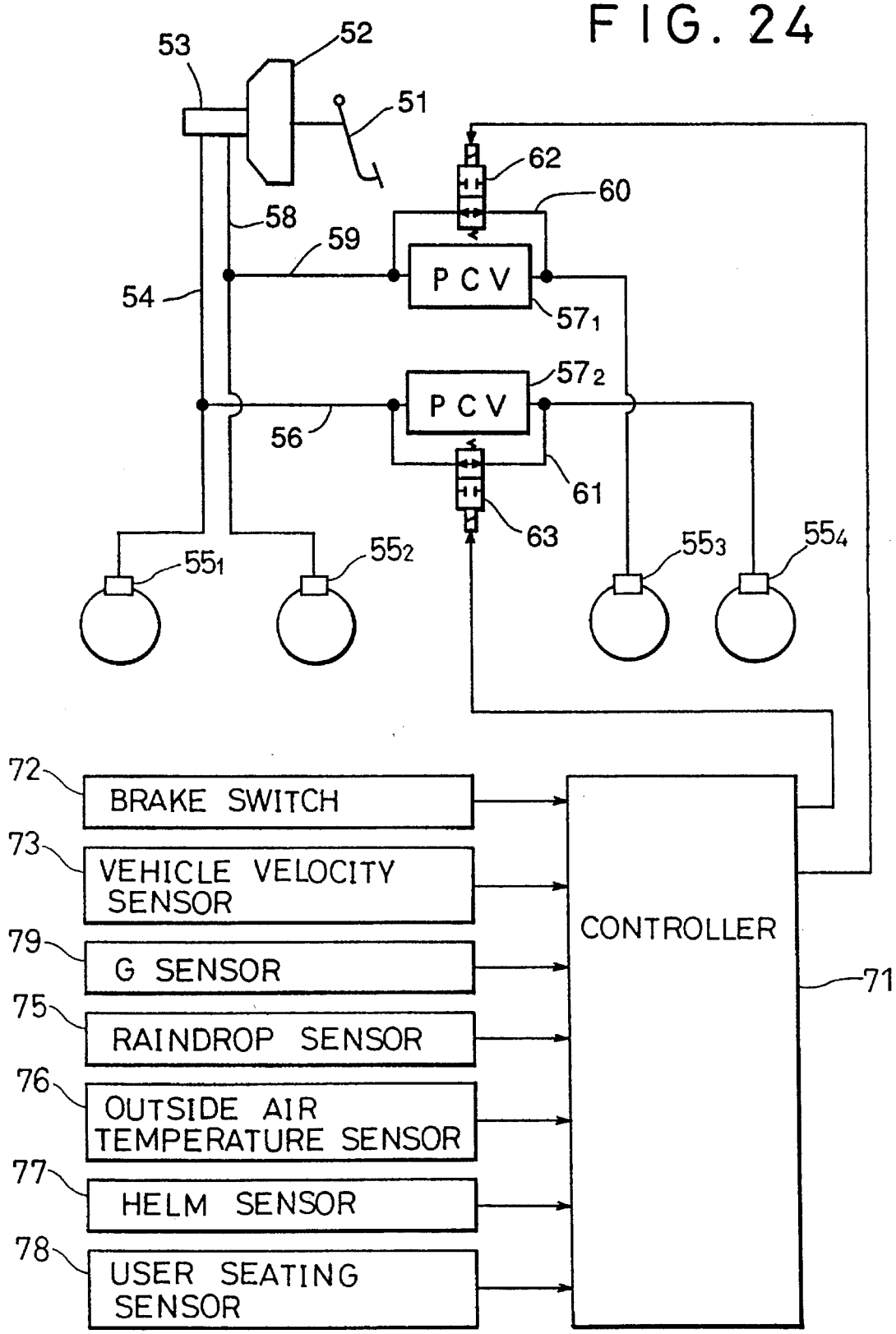
FIG. 24 is a block diagram showing a rear-wheel braking force control apparatus according to a sixth embodiment of the present invention.
Figure 25:
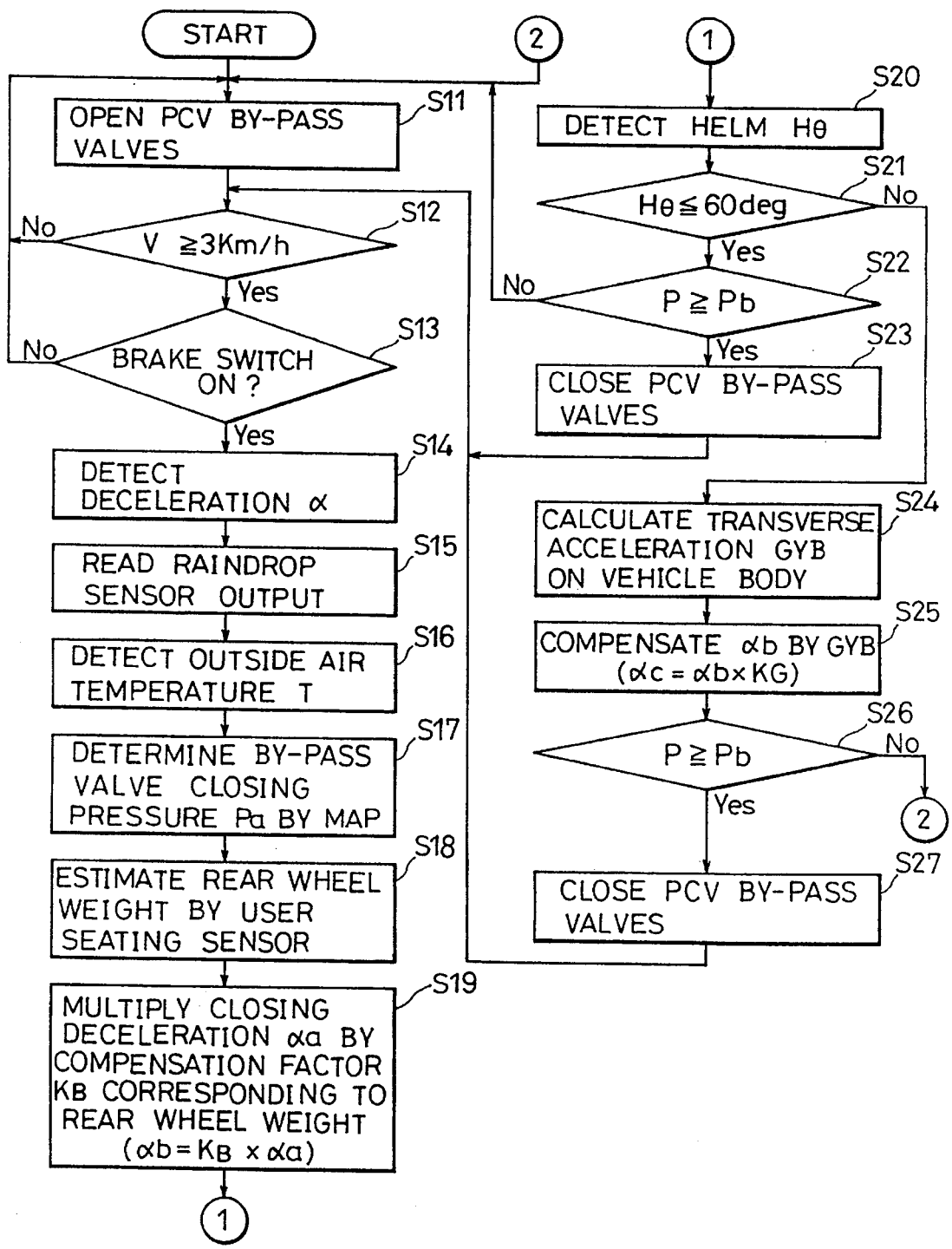
FIG. 25 is a flow chart for illustrating the operation of the control apparatus shown in FIG. 24.

FIG. 24 shows a rear wheel braking force control apparatus according to a sixth embodiment of the present invention, in which an acceleration sensor (G sensor) 79 as braking degree detecting means is used in place of the pressure sensor 74 used in the first embodiment. This G sensor 79 serves to detect the deceleration of the vehicle body. The processes shown in FIG. 25 are executed in the controller 71. In these processes, vehicle body decelerations α, which are detected by means of the G sensor 79, and closing decelerations αa, αb and αc, which are set in the controller 71, are used in place of the brake fluid pressures P and the closing pressures Pa, Pb and Pc, respectively, according to the first embodiment. Since the contents of processing are substantially the same as those for the case of the first embodiment, a detailed description of these contents is omitted.

According to the present embodiment, when the deceleration α of the vehicle body attains the predetermined value αb, the PCV by-pass valves 62 and 63 are closed so that the proportioning valves 57₁ and 57₂ fulfill their functions. When the vehicle turns, moreover, the PCV by-pass valves 62 and 63 are closed so that the deceleration of the vehicle body at which the proportioning valves start to fulfill their functions is one on the inner wheel side and another on the outer wheel side. Thus, the same effect of the foregoing first embodiment can be obtained.

The utilization of the vehicle body deceleration, described in connection with the present embodiment, may be also applied to the foregoing second to fifth embodiments in like manner.

The present invention is not limited to the individual embodiments described above, and various modifications may be effected therein.

Figure 26:
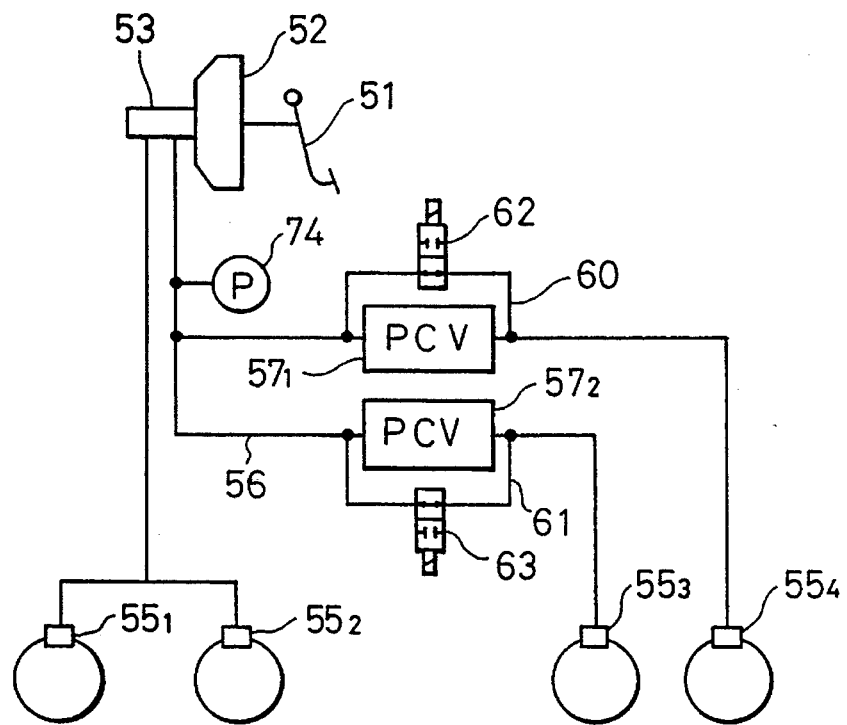
FIG. 26 is a piping system diagram showing a modification of the present invention.

For example, instead of using the X-piping configuration described in connection with the foregoing embodiments, a valve arrangement such as the one shown in FIG. 26 may be applied to front and rear piping systems which are generally used in an FR (front-engine rear-drive) car. Further, valves of any other types or properties may be used as the proportioning control valves. As for the road surface detecting means, furthermore, the means used in the individual embodiments may be used independently or in combination with one another. It is to be understood that various other modifications may be effected without departing from the spirit of the present invention.

We claim:

1. A rear wheel braking force control apparatus for a vehicle, which has proportioning valves arranged in passages connecting a master cylinder and wheel cylinders for rear left and rear right wheels, for controlling wheel cylinder pressure so that a rate of increase of the wheel cylinder pressures is lower than a rate of increase of a master cylinder pressure, solenoid-operated valves disposed in the passages for selectively making the pressure control action of the proportioning valves effective or ineffective, and a control means for controlling operation of the solenoid-operated valves, comprising:

road surface condition detecting means for detecting an outside weather condition indicative of slipperiness of a road surface; and means for detecting a degree of braking to which the vehicle is braked, the control means being arranged to establish a set braking degree on the basis of an information detected by said road surface condition detecting means, to adjust said set braking degree to a low level when the road surface is slippery, to actuate the solenoid-operated valves so that the action of the proportioning valves is made ineffective when the braking degree detected by said braking degree detecting means is lower than the set braking degree, and to actuate the solenoid-operated valves so that the action of the proportioning valves is made effective when the braking degree is equal to or greater than the set braking degree.

2. A rear wheel braking force control apparatus for a vehicle according to claim 1, wherein said road surface condition detecting means is a raindrop sensor.

3. A rear wheel braking force control apparatus for a vehicle according to claim 1, wherein said road surface condition detecting means is a windshield wiper switch.

4. A rear wheel braking force control apparatus for a vehicle according to claim 1, wherein said road surface condition detecting means includes means for detecting an outside air temperature, and the control means adjusts the set braking degree to a low level when the outside air temperature is low.

5. A rear wheel braking force control apparatus for a vehicle according to claim 1, wherein said road surface condition detecting means includes means for detecting an outside air temperature and means for detecting a windshield wiper operation period, and the control means determines the set braking degree by fuzzy inference based on the detected outside air temperature and the detected windshield wiper operation period.

6. A rear wheel braking force control apparatus for a vehicle according to claim 1, further including means for detecting a load on the rear wheels, and wherein the control means compensates the set braking degree for a high level when the detected rear wheel load is high.

7. A rear wheel braking force control apparatus for a vehicle according to claim 1, further including means for detecting a load on the rear wheels, and wherein the control means determines a reference level for the braking degree in accordance with the detected rear wheel load, and determines the set braking degree by compensating the reference braking degree on the basis of the information detected by said road surface condition detecting means.

8. A rear wheel braking force control apparatus for a vehicle according to claim 1, further including means for detecting a slip factor of the rear wheels, and wherein the control means compensates the set braking degree for a low level when the detected slip factor is high.

9. A rear wheel braking force control apparatus for a vehicle according to claim 1, further including means for detecting a vehicle velocity, and wherein the control means compensates the set braking degree for a low level when the vehicle velocity is high.

10. A rear wheel braking force control apparatus for a vehicle according to claim 1, further including means for detecting a hard braking operation, and wherein the control means compensates the set braking degree to a low level when the hard braking operation is detected.

11. A rear wheel braking force control apparatus for a vehicle according to claim 1, further including means for detecting turning of the vehicle, and wherein the proportioning valves and the solenoid-operated valves are provided for each of the rear left and rear right wheels, and the control means corrects the set braking degree in accordance with a detection output of said turning detecting means so that the set braking degree for the solenoid-operated valve on the side of outer turning wheels is higher than the set braking degree for the solenoid-operated valve on the side of inner turning wheels when the vehicle turns.

12. A rear wheel braking force control method for a vehicle, for controlling operation of solenoid-operated valves arranged in passages connecting a master cylinder and wheel cylinders for rear left and rear right wheels, the solenoid-operated valves serving to selectively make effective or ineffective an action of proportioning valves disposed in the passages to control wheel cylinder pressures so that a rate of increase of the wheel cylinder pressure is lower than a rate of increase of a master cylinder pressure, comprising the steps of:

(a) detecting an outside weather condition indicative of slipperiness of a road surface;

(b) detecting a degree of braking to which the vehicle is braked;

(c) setting a set braking degree on the basis of the information detected in said step (a) and adjusting the set braking degree to a low level when the road surface is slippery; and (d) actuating the solenoid-operated valves so that the action of the proportioning valves is made ineffective when the braking degree detected in said step (b) is lower than the set braking degree, and actuating the solenoid-operated valves so that the action of the proportioning valves is made effective when the braking degree detected in said step (b) is equal to or greater than the set braking degree.

13. A rear wheel braking force control apparatus for a vehicle, which has proportioning valves arranged in passages connecting a master cylinder and wheel cylinders for rear left and rear right wheels, for controlling wheel cylinder pressure so that a rate of increase of the wheel cylinder pressures is lower than a rate of increase of a master cylinder pressure, solenoid-operated valves disposed in the passages for selectively making the pressure control action of the proportioning valves effective or ineffective, and a control means for controlling operation of the solenoid-operated valves, comprising:

road surface condition detecting means for detecting a rough road indicative of slipperiness of the road surface; and means for detecting a degree of braking to which the vehicle is braked, the control means being arranged to establish a set braking degree on the basis of an information detected by said road surface condition detecting means, to adjust said set braking degree to a low level when the road surface is slippery, to actuate the solenoid-operated valves so that the action of the proportioning valves is made ineffective when the braking degree detected by said braking degree detecting means is lower than the set braking degree, and to actuate the solenoid-operated valves so that the action of the proportioning valves is made effective when the braking degree is equal to or greater than the set braking degree.

14. A rear wheel braking force control apparatus for a vehicle according to claim 13, further including means for detecting a load on the rear wheels, and wherein the control means compensates the set braking degree for a high level when the detected rear wheel load is high.

15. A rear wheel braking force control apparatus for a vehicle according to claim 13, further including means for detecting a load on the rear wheels, and wherein the control means determines a reference Level for the braking degree in accordance with the detected rear wheel load, and determines the set braking degree by compensating the reference braking degree on the basis of the information detected by said road surface condition detecting means.

16. A rear wheel braking force control apparatus for a vehicle according to claim 13, further including means for detecting a slip factor of the rear wheels, and wherein the control means compensates the set braking degree for a low level when the detected slip factor is high.

17. A rear wheel braking force control apparatus for a vehicle according to claim 13, further including means for detecting a vehicle velocity, and wherein the control means compensates the set braking degree for a low level when the vehicle velocity is high.

18. A rear wheel braking force control apparatus for a vehicle according to claim 13, further including means for detecting a hard braking operation, and wherein the control means compensates the set braking degree to a low level when the hard braking operation is detected.

19. A rear wheel braking force control apparatus for a vehicle according to claim 13, further including means for detecting turning of the vehicle, and wherein the proportioning valve and the solenoid-operated valve are provided for each of the rear left and right wheels, and the control means corrects the set braking degree in accordance with a detection output of said turning detecting means so that the set braking degree for the solenoid-operated valve on the side of outer turning wheels is higher than the set braking degree for the solenoid-operated valve on the side of inner turning wheels when the vehicle turns.

20. A rear wheel braking force control method for a vehicle, for controlling operation of solenoid-operated valves arranged in passages connecting a master cylinder and wheel cylinders for rear left and rear right wheels, the solenoid-operated valves serving to selectively make effective or ineffective an action of proportioning valves disposed in the passages to control wheel cylinder pressures so that a rate of increase of the wheel cylinder pressure is lower than a rate of increase of a master cylinder pressure, comprising the steps of:

(a) detecting a rough road indicative of slipperiness of the road surface;

(b) detecting a degree of braking to which the vehicle is braked;

(c) setting a set braking degree on the basis of the information detected in said step (a) and adjusting the set braking degree to a low level when the road surface is slippery; and (d) actuating the solenoid-operated valves so that the action of the proportioning valves is made ineffective when the braking degree detected in said step (b) is lower than the set braking degree, and actuating the solenoid-operated valves so that the action of the proportioning valves is made effective when the braking degree detected in said step (b) is equal to or greater than the set braking degree.

21. A rear wheel braking force control method for a vehicle comprising the steps of:

(a) detecting roughness of a road surface indicative of slipperiness of the road surface;

(b) detecting an actual degree of braking to which the vehicle is braked;

(c) determining a desired set braking degree for rear wheels on the basis of said roughness of said road surface indicative of slipperiness of the road surface and adjusting the set braking degree to a low level when said road surface is determined to be slippery; and (d) varying the actual degree of braking to the rear wheels of the vehicle when said detected braking degree is equal to or greater than said set braking degree.

22. A rear wheel braking force control method for a vehicle comprising the steps of:

(a) detecting a friction coefficient of a road surface based on a steering angle of the vehicle, a power steering fluid pressure, and a velocity of the vehicle;

(b) detecting an actual degree of braking to which the vehicle is braked;

(c) determining a desired set braking degree for rear wheels on the basis of said friction coefficient and adjusting the set braking degree to a low level when said friction coefficient is determined to be low; and (d) varying the actual degree of braking to the rear wheels of the vehicle when said detected braking degree is equal to or greater than said set braking degree.

23. A rear wheel braking force control apparatus for a vehicle comprising:

road surface condition detecting means for detecting roughness of a road surface indicative of slipperiness of the road surface;

actual braking degree detecting means for detecting an actual degree of braking to which the vehicle is braked;

desired set braking determining means for determining a desired set braking degree for rear wheels on the basis of said roughness of said road surface and adjusting said desired set braking degree to a low level when said road surface is determined to be slippery; and proportioning means for varying the actual degree of braking to the rear wheels of the vehicle when said detected braking degree is equal to or greater than said desired braking degree.

24. A rear wheel braking force control apparatus for a vehicle comprising:

road surface condition detecting means for detecting a friction coefficient of a road surface based on a steering angle of the vehicle, a power steering fluid pressure, and a velocity of the vehicle;

actual braking degree detecting means for detecting an actual degree of braking to which the vehicle is braked;

desired set braking determining means for determining a desired set braking degree for rear wheels on the basis of said road surface condition and adjusting said desired set braking degree to a low level when said friction coefficient is determined to be low; and proportioning means for varying the actual degree of braking to the rear wheels of the vehicle when said detected braking degree is equal to or greater than said desired braking degree.

* * * * *

UNITED STATES PATENT AND TRADEMARK OFFICE
CERTIFICATE OF CORRECTION

PATENT NO. : 5,480,221
DATED : January 2, 1996
INVENTOR(S) : T. Morita et al.

It is certified that error appears in the above-indentified patent and that said Letters Patent is hereby corrected as shown below:

On the title page, item [63] Related U.S. Application Data, change "Continuation of Ser. No. 94,034, filed as PCT/JP92/01555 Nov. 27, 1992, abandoned." to —Continuation of Ser. No. 94,034, filed Sep. 29,1993, abandoned, which was the national stage international application number PCT/JP92/01555, filed Nov. 27, 1992.—

Signed and Sealed this

Thirtieth Day of July, 1996

Attest:

BRUCE LEHMAN

*Attesting Officer*  Commissioner of Patents and Trademarks